Figure 1:
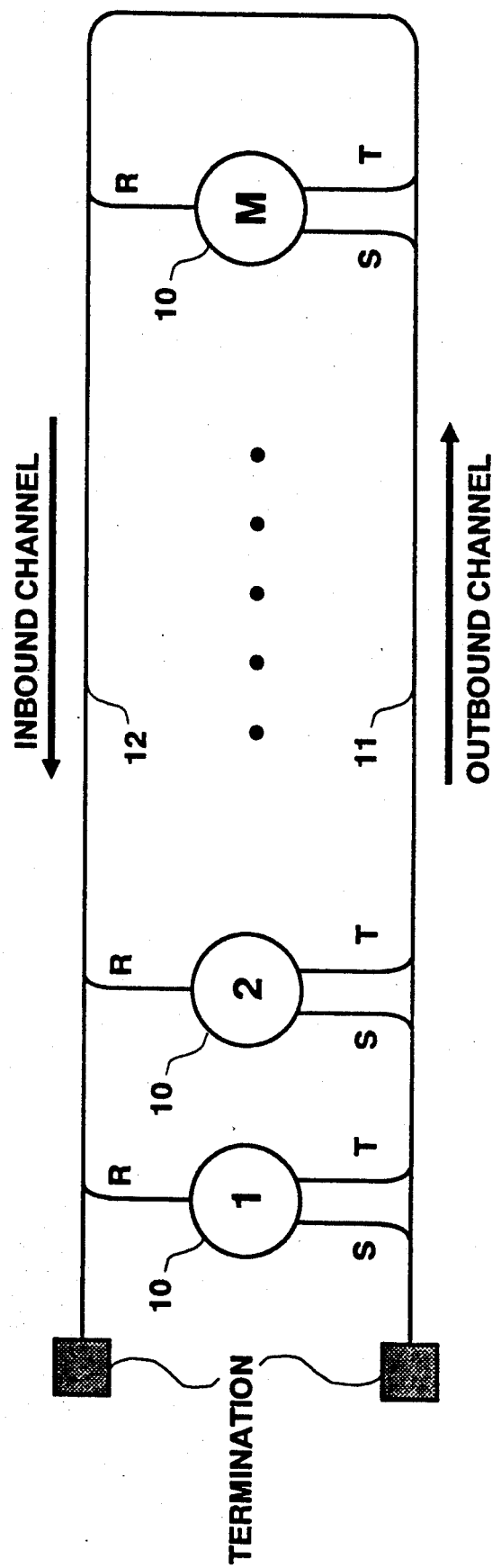

US005157659A

United States Patent [19]

Schenkel

[11] Patent Number: 5,157,659
[45] Date of Patent: Oct. 20, 1992

[54] PACKET COMMUNICATION SYSTEM AND METHOD OF CLEARING COMMUNICATION BUS

[75] Inventor: David P. Schenkel, Ottawa, Canada

[73] Assignee: Canai Computer and Network Architecture Inc., Stittsville, Canada

[21] Appl. No.: 534,484

[22] Filed: Jun. 7, 1990

[51] Int. Cl.$^5$ ............................ H04J 3/00; H04J 3/24
[52] U.S. Cl. .................................. 370/85.3; 370/85.6; 370/94.1; 340/825.51
[58] Field of Search ...................... 370/85.1, 85.2, 85.3, 370/85.6, 85.9, 85.11, 93, 94.1, 94.2; 340/825.5, 825.51, 825.52

[56] References Cited

U.S. PATENT DOCUMENTS

| | | | |
|---|---|---|---|
| 4,498,168 | 2/1985 | Tseng | 370/85.3 |
| 4,510,599 | 4/1985 | Ulug | 370/85.9 |
| 4,517,670 | 5/1985 | Ulug | 370/85.9 |
| 4,532,626 | 7/1985 | Flores et al. | 370/85.9 |
| 4,707,829 | 11/1987 | Pendse | 370/85.6 |
| 4,814,974 | 3/1989 | Narayanan et al. | 370/85.6 |

Primary Examiner—Douglas W. Olms
Assistant Examiner—Alpus H. Hsu
Attorney, Agent, or Firm—Antonelli, Terry, Stout & Kraus

[57] ABSTRACT

An apparatus and method of communicating data signals on a bus having an upstream portion to which transmitters of a plurality of station are connected, and a downstream portion to which receivers of the stations are connected, and to which an end station is connected having a transmitter connected more upstream than any of the plurality of stations. Signals to be transmitted from each of the plurality of stations are appended to the end of the data stream passing thereby. A bus clear signal is transmitted from the end station, along the bus. When any signal including the bus clear signal is detected from upstream at any of the plurality of stations that might be transmitting, transmission of signals from the plurality of stations is immediately terminated. Transmission of the bus clear signal from upstream thus clears the bus to allow for transmission of different priority signals on the bus.

27 Claims, 32 Drawing Sheets

FIGURE 22

FRAME

| Priority Class Round | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 |
|---|---|---|---|---|---|---|---|---|---|---|---|---|---|---|---|---|---|---|---|---|---|---|---|---|---|---|---|---|---|---|---|
| 1 | S | E | S | E | S | E | S | E | S | E | S | E | S | E | S | E | S | E | S | E | S | E | S | E | S | E | S | E | S | E | S |
| 2 |   | S |   | E |   | S |   | E |   | S |   | E |   | S |   | E |   | S |   | E |   | S |   | E |   | S |   | E |   | S |   |
| 3 |   |   |   | S |   |   |   | E |   |   |   | S |   |   |   | E |   |   |   | S |   |   |   | E |   |   |   | S |   |   |   |
| 4 |   |   |   |   |   |   |   | S |   |   |   |   |   |   |   | E |   |   |   |   |   |   |   | S |   |   |   |   |   |   |   |
| 5 |   |   |   |   |   |   |   |   |   |   |   |   |   |   |   | S |   |   |   |   |   |   |   |   |   |   |   |   |   |   |   |

PACKET COMMUNICATION SYSTEM AND METHOD OF CLEARING COMMUNICATION BUS

FIELD OF THE INVENTION

This invention relates to a multiple access bus communication system which uses unslotted unidirectional broadcast system channels, and particularly to a method and apparatus for clearing the bus and definining when data signals can be transmitted.

BACKGROUND OF THE INVENTION

In electronic systems such as communications systems, computing systems, and control systems, various system elements must exchange information. Typically such systems use internal buses that employ a multiple access protocol. Such buses typically allow system elements to exchange information which is organised into data packets, allocating a portion of the capacity of the bus to each system element in some manner.

The various types of information that must be exchanged between system elements impose different constraints on the packet communication provided by the multiple access buses. Some have different bandwidth requirements, some vary in priority relative to each other. Some must be exchanged within a relatively short fixed time constraint to facilitate synchronous transmission, while others can tolerate the much longer variable delays associated with asynchronous transmission. The present invention provides a means for accommodating all of the types of signals noted above, on the same bus.

DESCRIPTION OF THE PRIOR ART

In a bus system described in U.S. Pat. No. 4,498,168 issued Feb. 5th, 1985 to T.R.W. Inc., a "locomotive signal" generator is used which transmits a data train preamble along an outbound bus to which various stations are connected, and the various stations, if ready to transmit, add data packets to the end of the locomotive signal or to the end of the passing data train that follows the locomotive signal upon detecting the end of the data transmission passing on the outbound bus. Should a station be attempting to transmit when a new locomotive is generated, a packet being transmitted will suffer collision. Collisions are considered to be destructive, and require retransmission of corrupted packets. In such prior art systems collisions are to be avoided if possible since they corrupt data and require retransmission, and thus are considered as reducing the capacity of and slowing down the transmission system.

SUMMARY OF THE INVENTION

The present invention is a system and method that purposely introduces collisions at predetermined times as one of the key elements to achieve the aforenoted benefits.

The various stations connected along the bus in the present invention use the known "Attempt-And-Defer Access Contention Protocol" (AADACP), in which the stations interrupt transmission should they sense transmission energy arriving from upstream on the bus. An end station transmits a special signal which is sensed by each of the stations, causing collisions with signals from those stations that may be transmitting, and inhibiting the others from transmitting. This special signal thus acts as a bus clearing signal. Following the end of the bus clearing signal, the stations, using AADACP, transmit highest priority data packets, which may, for example, be synchronous data, e.g. as may be required for the transmission of digitized video signals, PCM audio signals, etc.

The end station may also transmit, either round clearing signals (similar to but differentiable from bus clearing signals) at predetermined times between the bus clearing signals (and thus at predetermined times within a frame) or new locomotives (if the end of the previous round occurs before the predetermined time of a round clear signal), or locomotives alone if round clearing signals are not employed. Following each round clearing signal or locomotive, the stations, using AADACP transmit lower priority data packets, which may be asynchronous signals. Each round clearing signal or locomotive constitutes a new round for lower priority signals than those carried in the round initiated by the bus clearing signal. Round clearing signals terminate the transmission of higher priority data packets and clear the bus in the same manner as a bus clearing signal but cause the start of a new lower priority round. A locomotive is used to start a new low priority round when a round clear signal is not employed for this purpose. The various rounds for lower priority signals may be all of similar priority; several rounds for a single class of lower priority signals may be initiated by the round clearing signals or locomotives between bus clearing signals. Alternatively there may be multiple priorities of lower priority signals, which may be transmitted in order of decreasing priority in the several rounds following the highest priority round which immediately follows each bus clearing signal.

In this manner signals of various bandwidths from low bandwidth to at least video bandwidth, at data rates to at least several gigahertz, of various priorities, and mixed synchronous and asynchronous signals may be transmitted along the same bus. Rather than attempting to avoid collisions, collisions are purposely introduced by a bus clearing signal which defines the beginning of a frame in which the highest priority signals immediately follow, followed by lower priority signals. The bus clearing signals, in inducing collisions with signals transmitted from stations using the AADACP protocol, thus causes termination of the transmission of lower priority signals and both clears the bus and prepares it for carrying highest priority signals. Collisions are also purposely introduced by round clearing signals (similar to but differentiable from the bus clearing signals) that occur between bus clearing signals, which define the beginning of lower priority rounds in which lower priority signals immediately follow. The round clearing signals, in inducing collisions with higher priority signals transmitted from stations using the AADACP protocol, thus causes the termination of the transmission of higher priority signals and both clears the bus and prepares it for carrying lower priority signals. Thus the present invention employs collisions to advantage in that it permits precise termination of network activity at instants determined by a single end station alone.

By the use of the clearing signals, the present invention thus can both simultaneously terminate a frame and start a new frame, without other stations having knowledge of the duration of the frame to be terminated, without need for a timer in a station to determine when such frames must be terminated or initiated, and using only information transmitted and received by the end station within an unslotted unidirectional broadcast system (UBS) channel. In prior art systems each station must know the duration of the cycle and must maintain a precise cycle timer in alignment with all the other stations in the network.

The present invention can both simultaneously terminate a round within a frame and start a new round within a frame, without other stations having knowledge of the duration of the round to be terminated, without need for a timer in each station to determine when such rounds must be terminated or initiated, and using only information transmitted and received by the end station within the unslotted UBS channel. Prior art systems require that each station should know the maximum duration of a round, and require each station to time the duration of each round, terminating the round when its round reaches the round's maximum duration.

The present invention has a flexibility to vary the number and duration of rounds within a given frame. Fixed or dynamically variable boundaries between rounds within frames can be achieved. Prior art systems require that the round boundary information be distributed in all stations within the network while in the present invention there is control from a single station in the network with no preknowledge required within the other stations of where in time the round boundaries will be.

The present invention provides means to incorporate a fair round robin allocation scheme associated with each priority class.

The present invention provides a novel method and means for stations to recover a synchronous frame clock from control signals generated by the end station. It also provides a novel method and means to allow a synchronous frame clock in the end station to be phase locked to another synchronous frame clock source within any station attached to the network. This had not been previously achieved in the prior art.

The present invention also facilitates the end station to provide a flexible superframing structure on the frame sequence, compatible with the present invention. Superframes allow a station to selectively transmit packets in only certain frames within the superframe structure.

An embodiment of the present invention is a data communication system comprising a unidirectional bus carrying data signals, having an upstream portion and a downstream portion, an end station connected to the upstream portion of the bus, other stations connected to the bus downstream of the end station on the upstream portion of the bus, apparatus at each of the other stations for appending data signals it may have to transmit to the end of a train of data signals passing thereby downstream on the upstream portion of the bus, apparatus at the end station for transmitting a bus clear signal along the bus at predetermined intervals whether or not there are signals carried by the bus, apparatus at each of the other stations for detecting data signals from upstream on the upstream portion of the bus or the bus clear signal and for immediately terminating transmission of data signals it may be transmitting on the upstream portion of the bus.

Another embodiment of the invention is a method of communicating data signals on a bus having an upstream portion to which transmitters of a plurality of stations are connected, and a downstream portion to which receivers are connected, and to which an end station is connected having a transmitter connected more upstream than any of the plurality of stations, comprising the steps of appending signals to be transmitted from each of the plurality of stations to the end of a data stream passing thereby, transmitting from time to time a bus clear signal from the end station along the bus whether or not the bus is carrying signals, detecting at the plurality of stations signals from upstream including the bus clear signal and immediately terminating transmission of the signals to be transmitted.

BRIEF INTRODUCTION TO THE DRAWINGS

Figure 2:
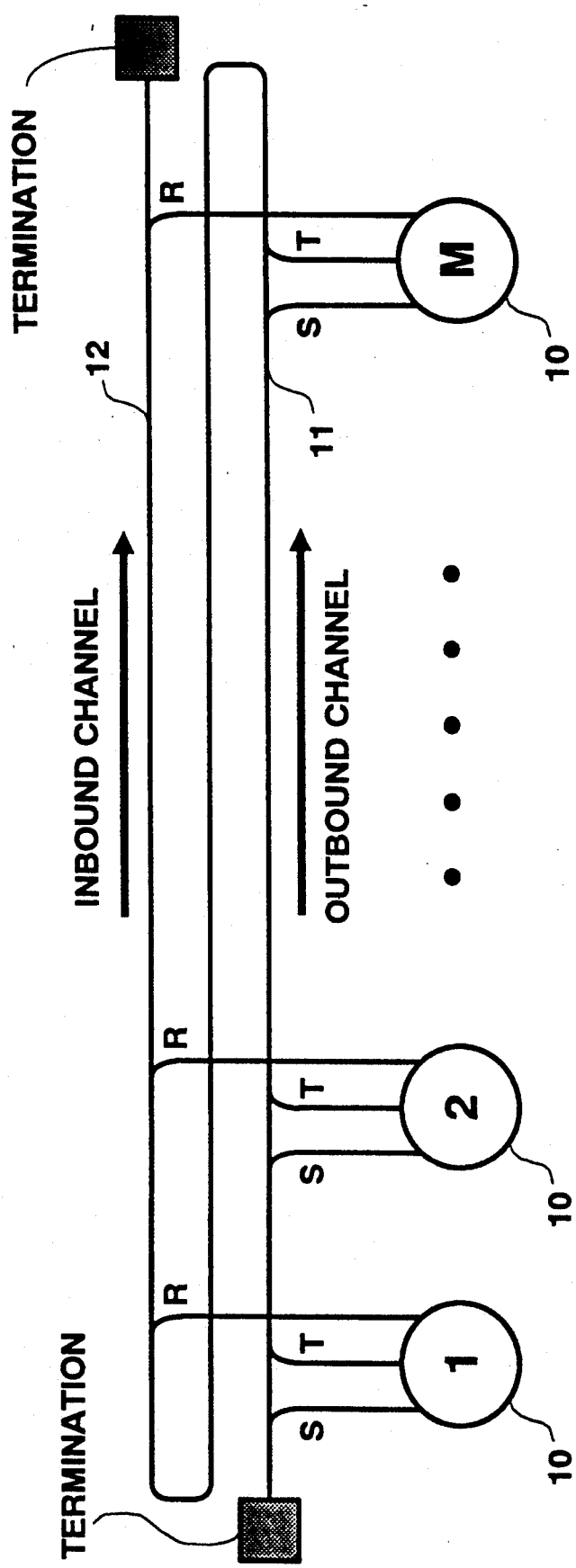
Figure 3:
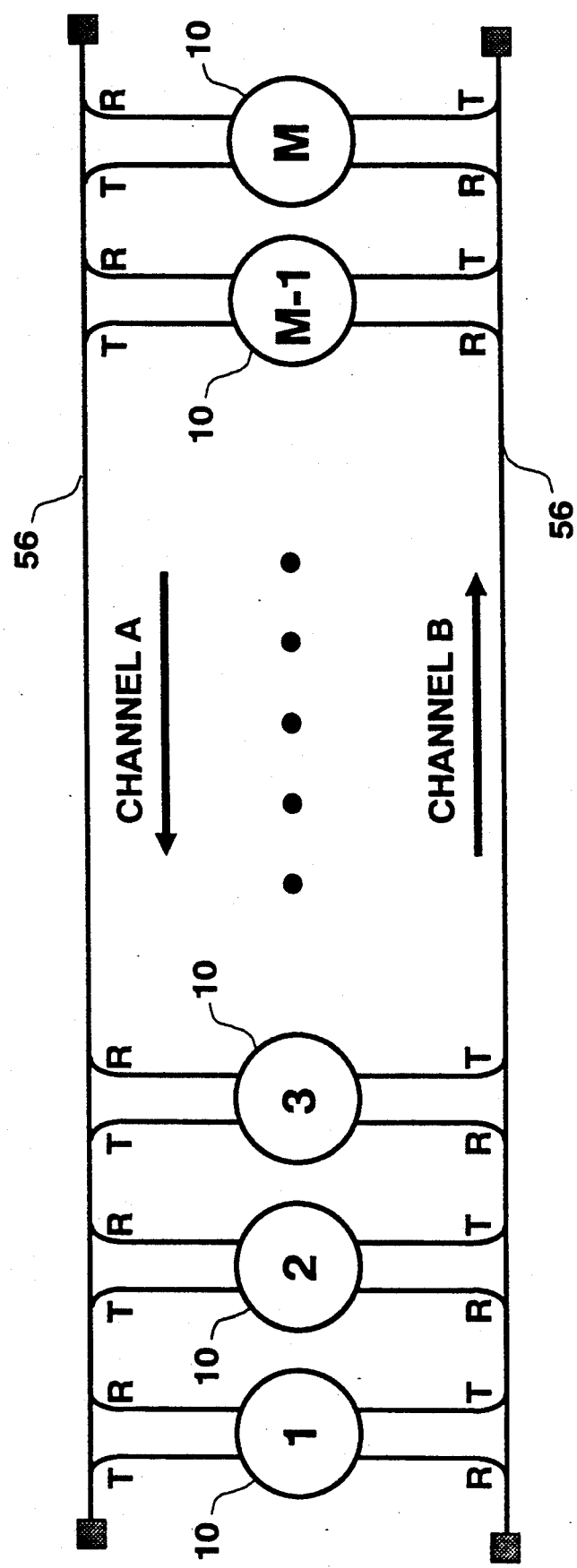
Figure 4A:
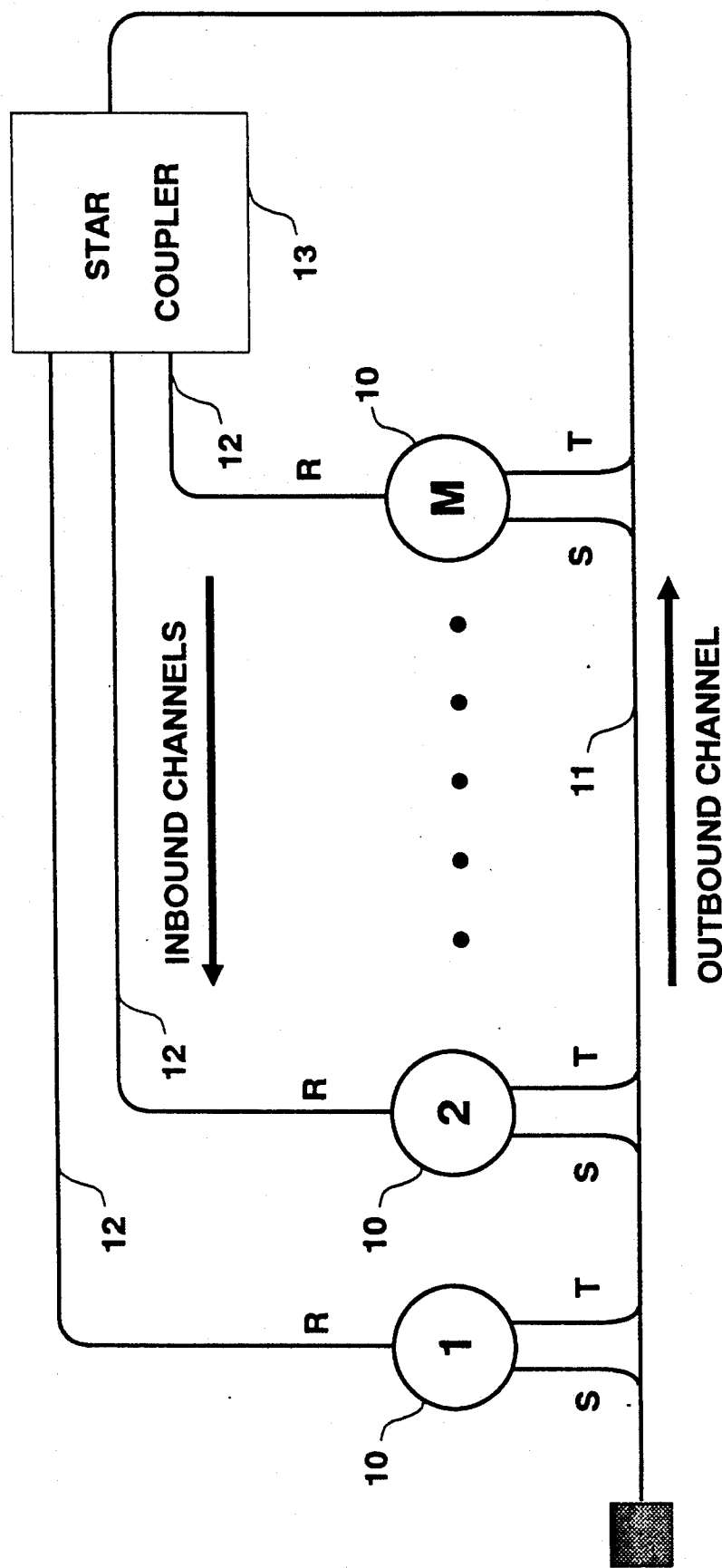
Figure 4B:
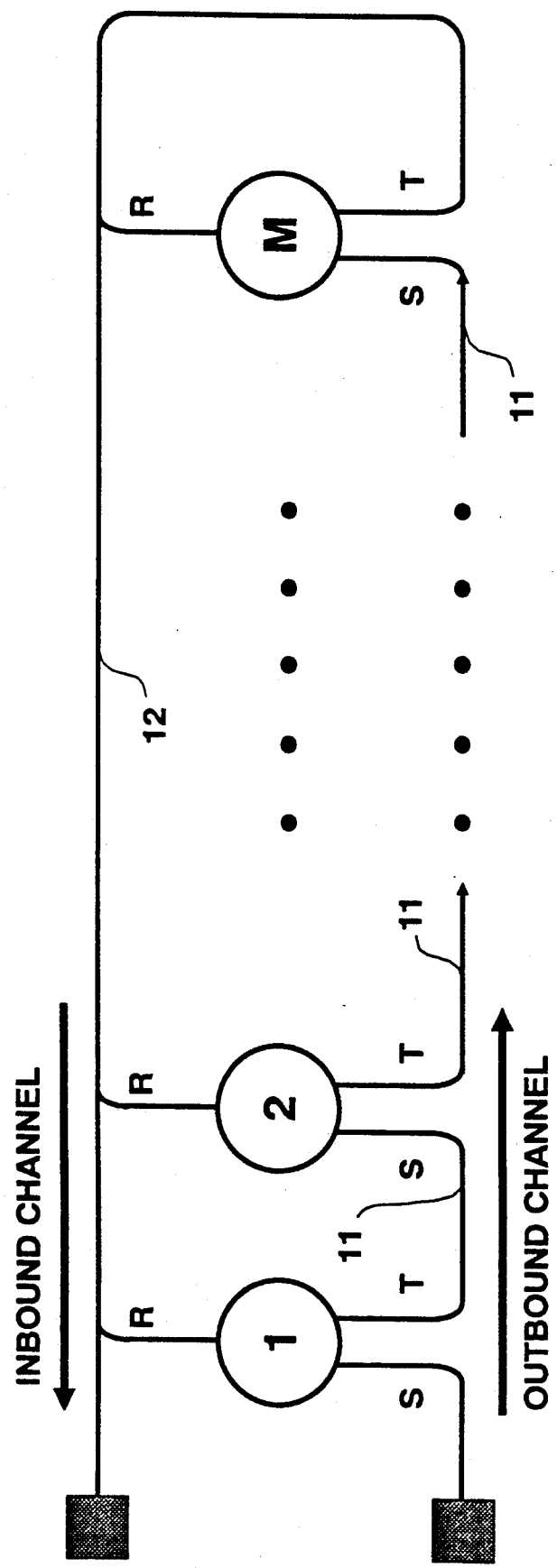
Figure 5:
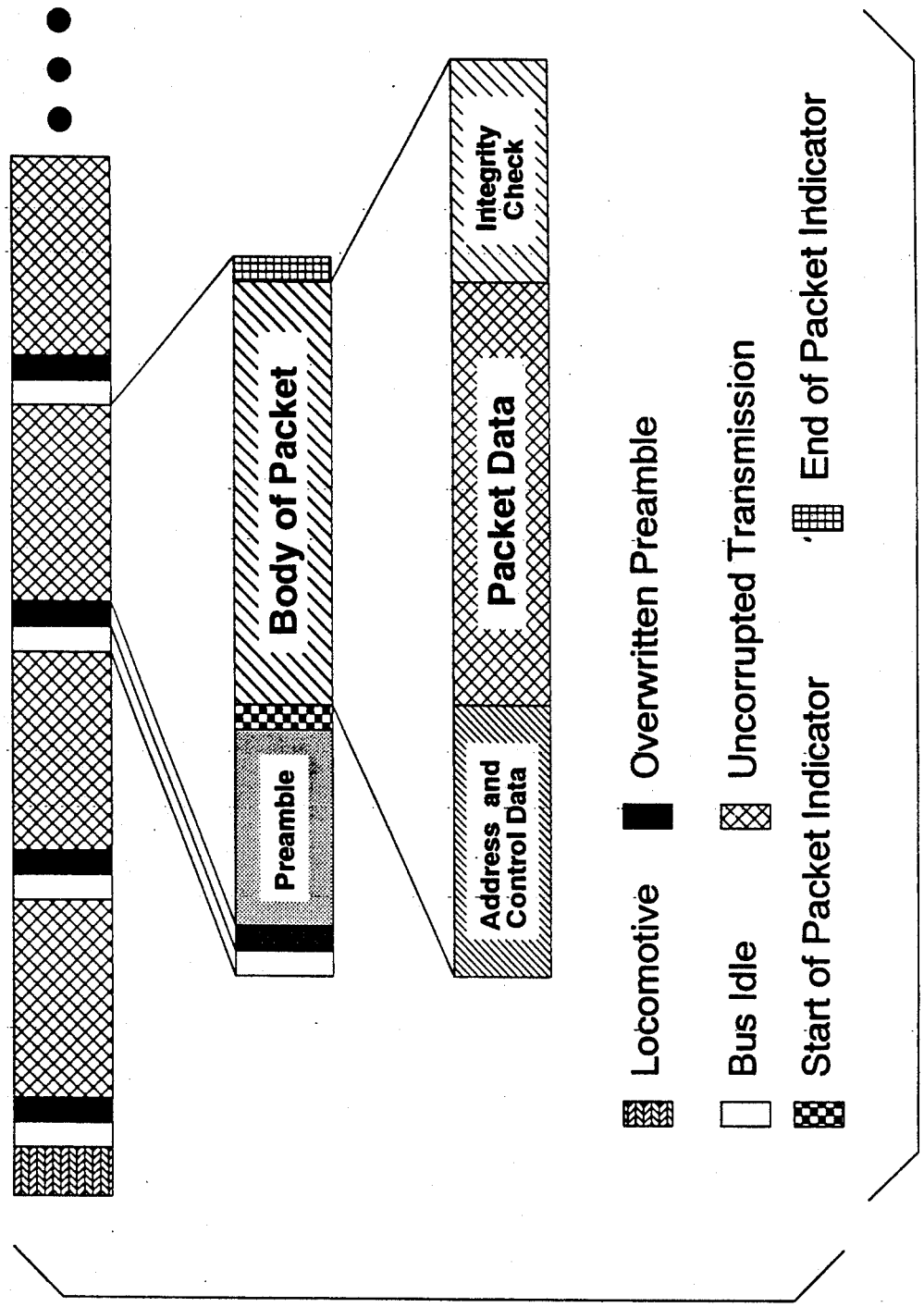
Figure 6:
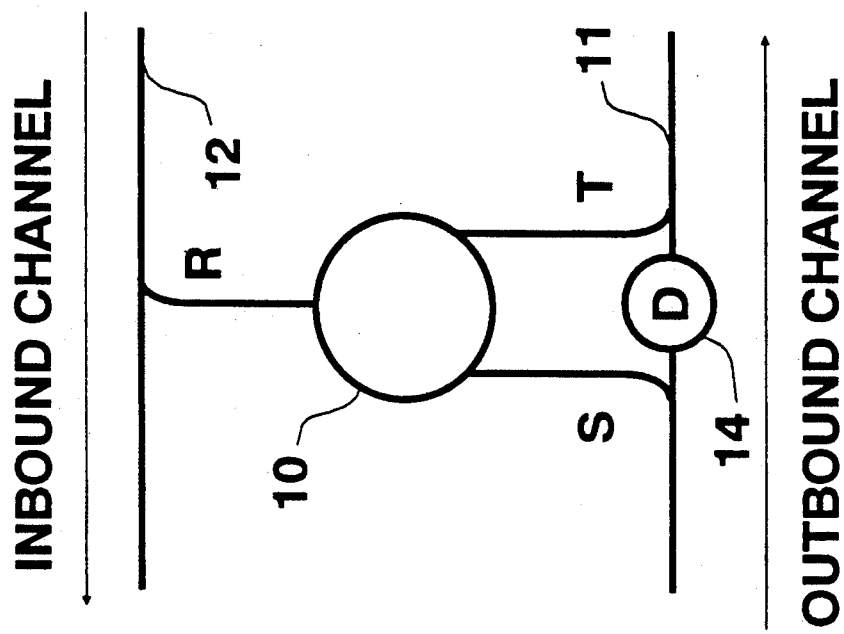
Figure 7:
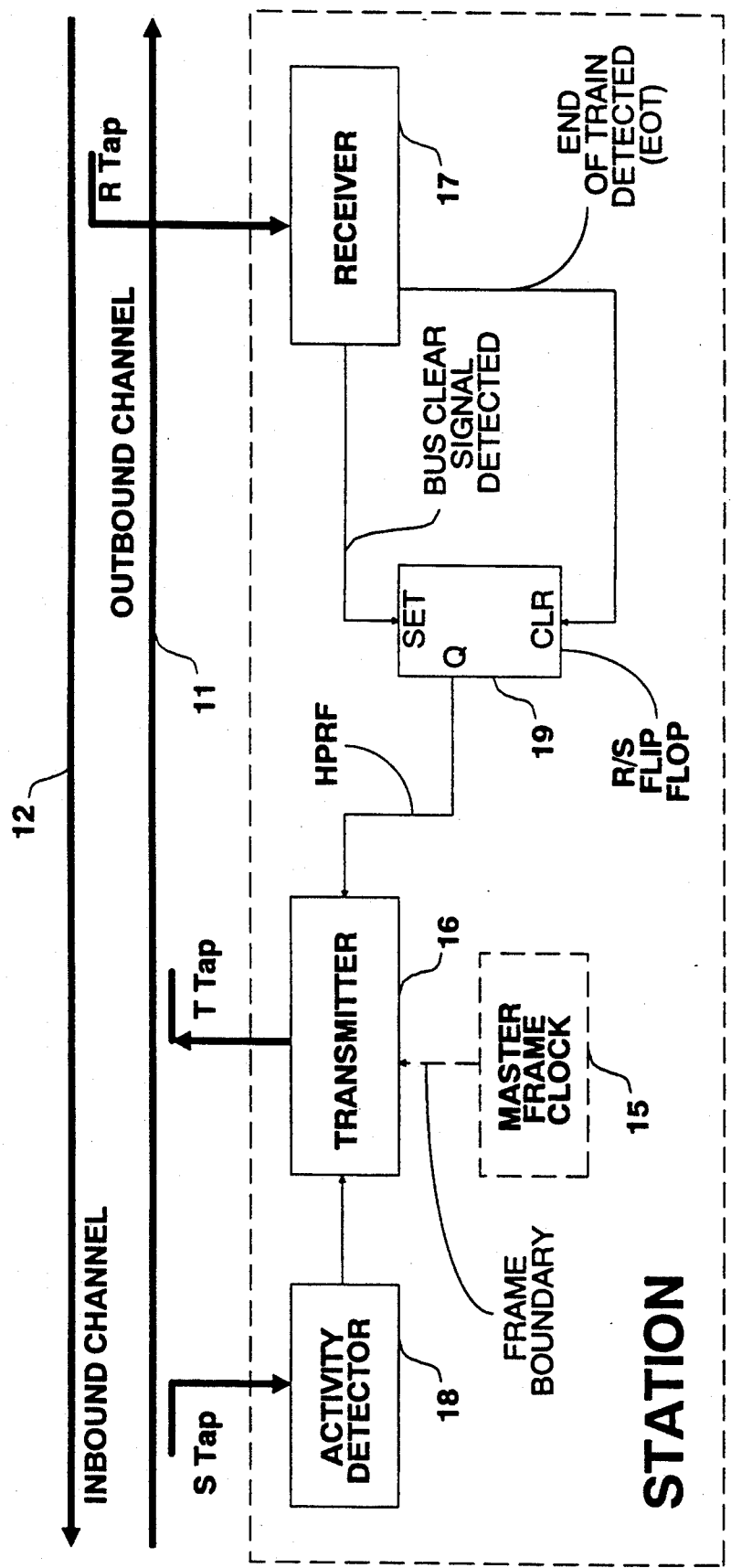
Figure 8:
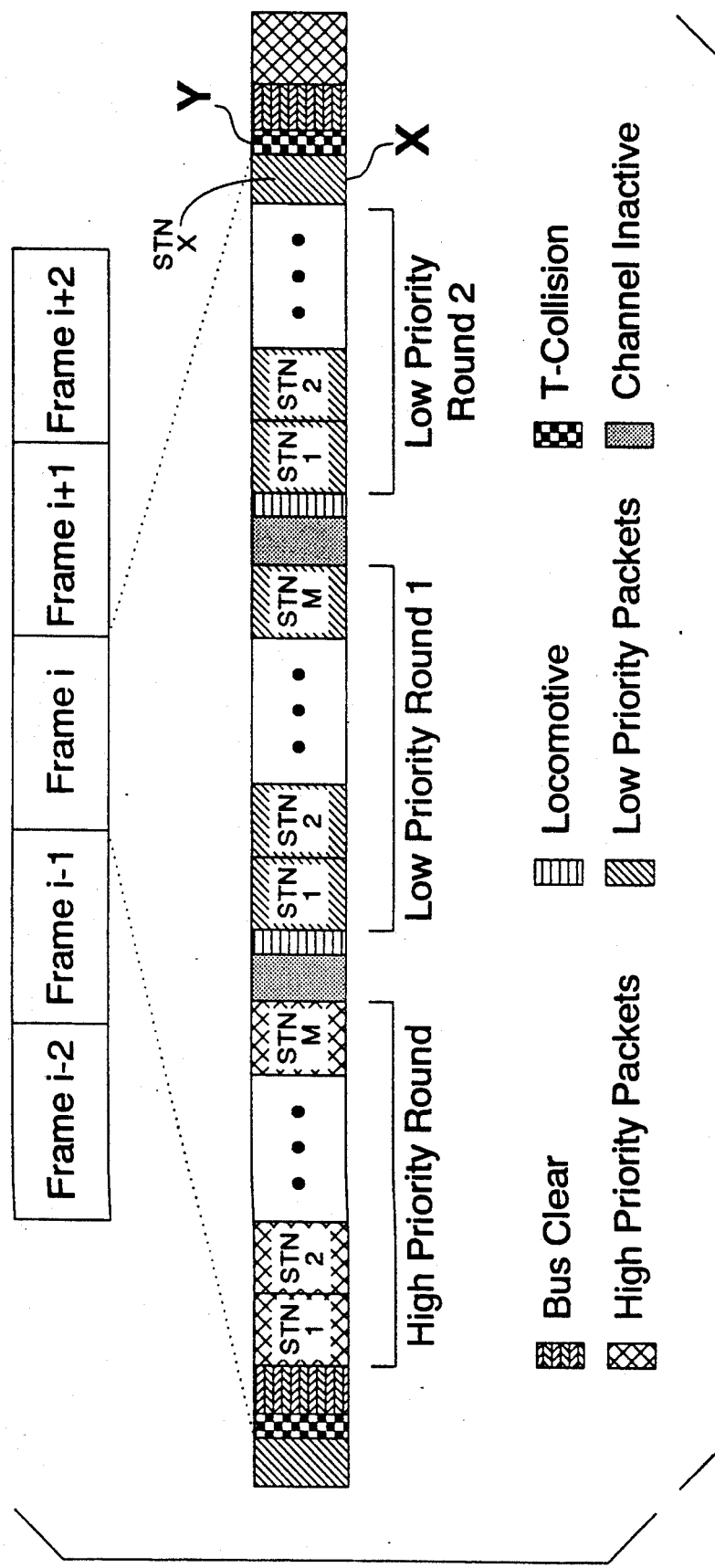
Figure 9:
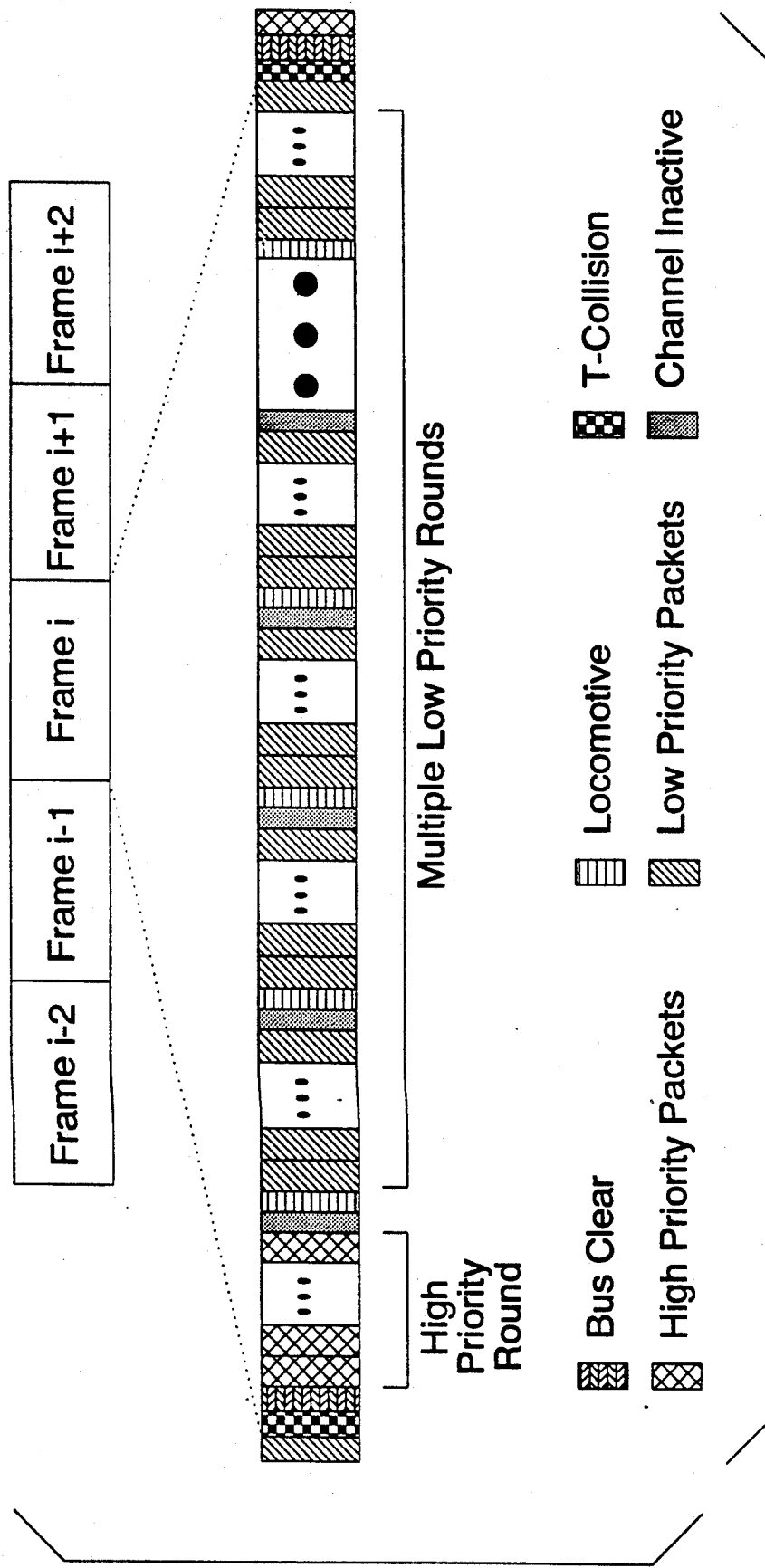
Figure 10:
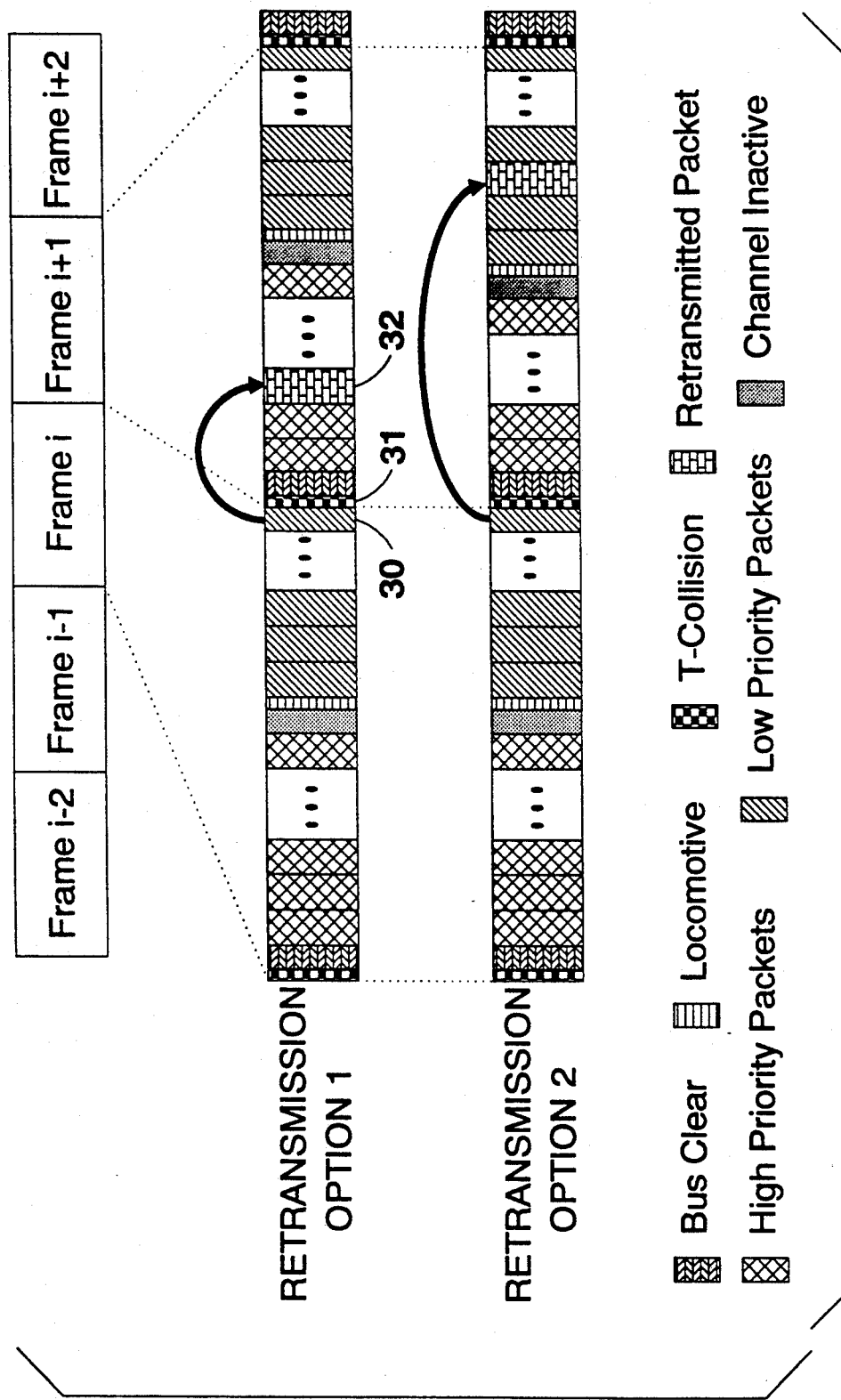
Figure 11:
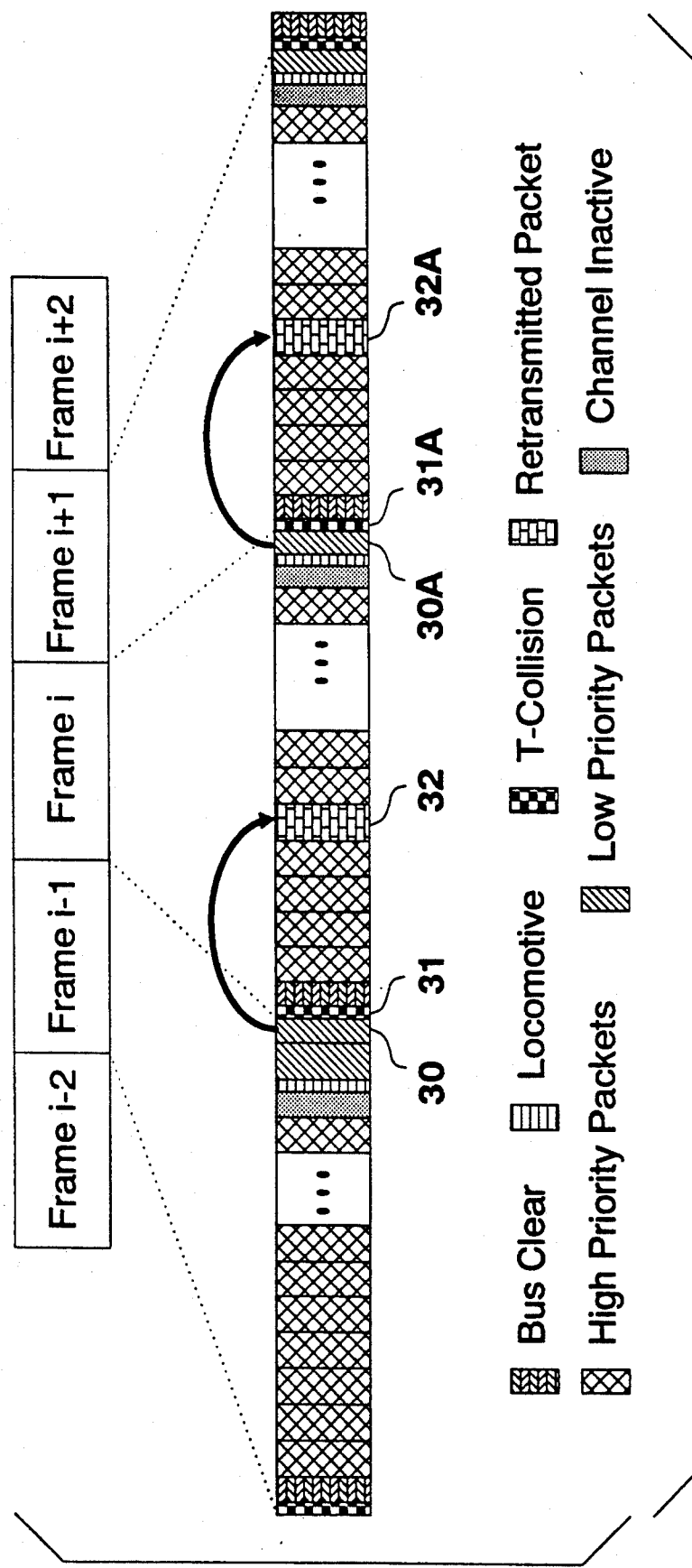
Figure 12:
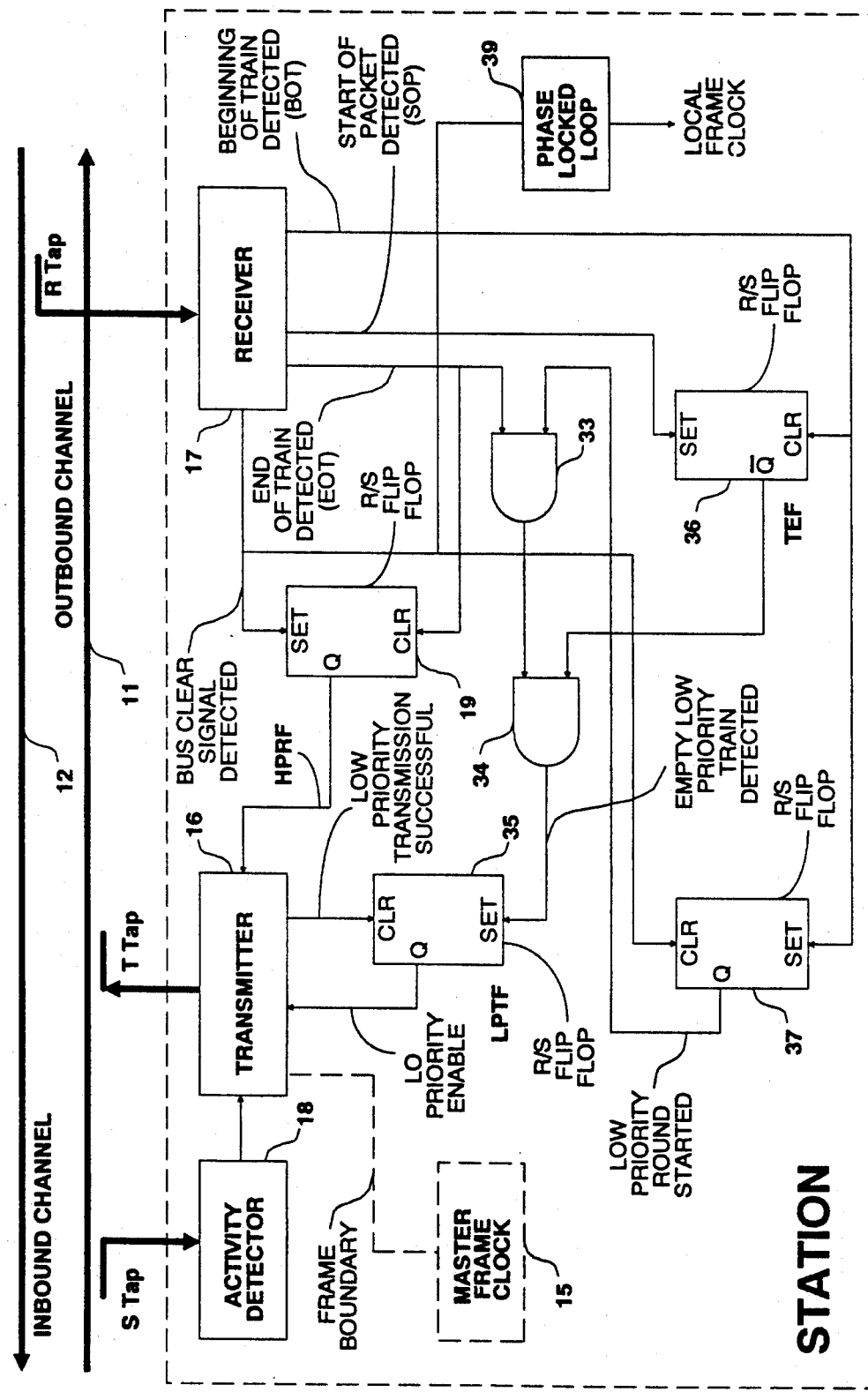
Figure 13:
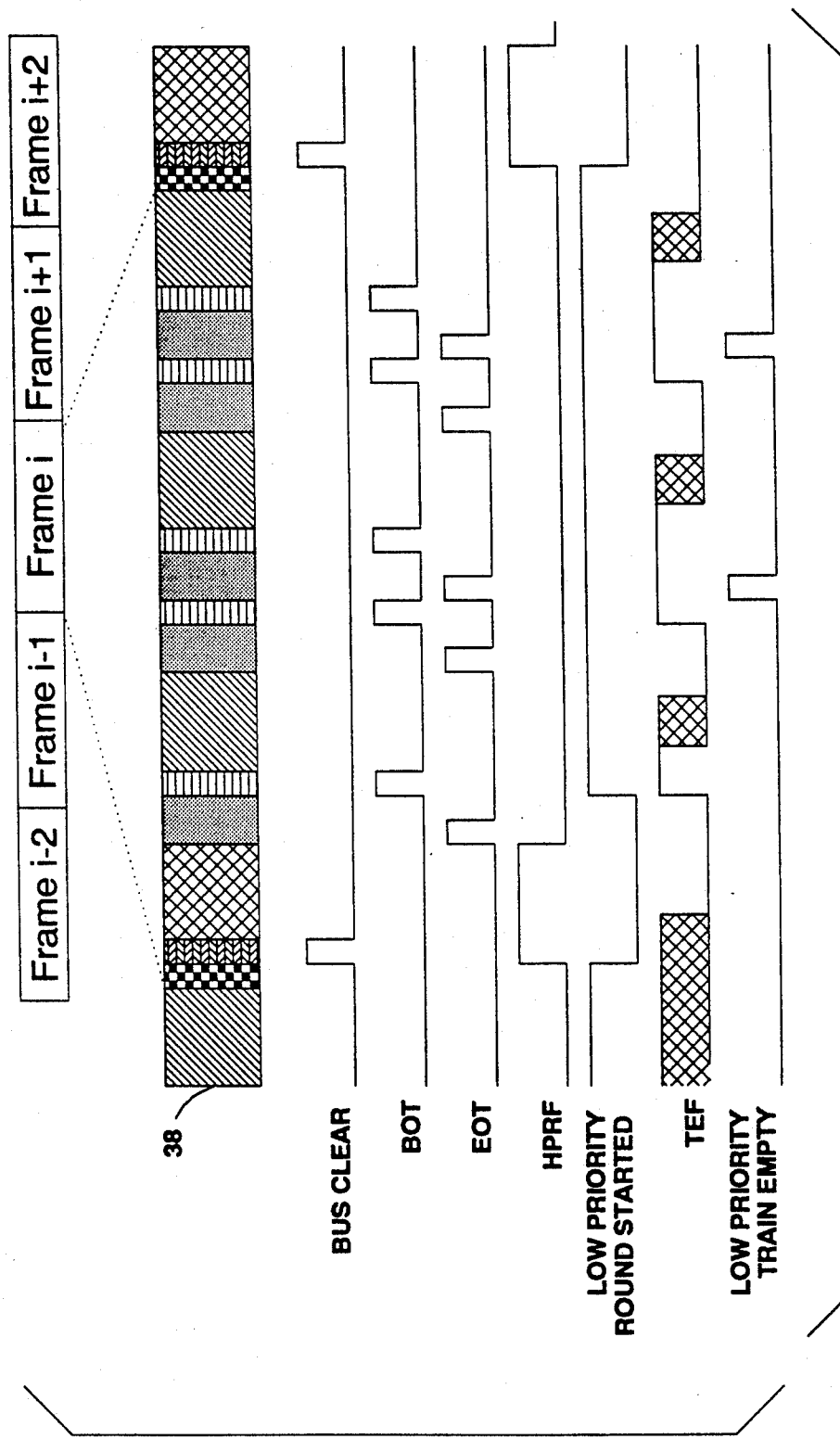
Figure 14:
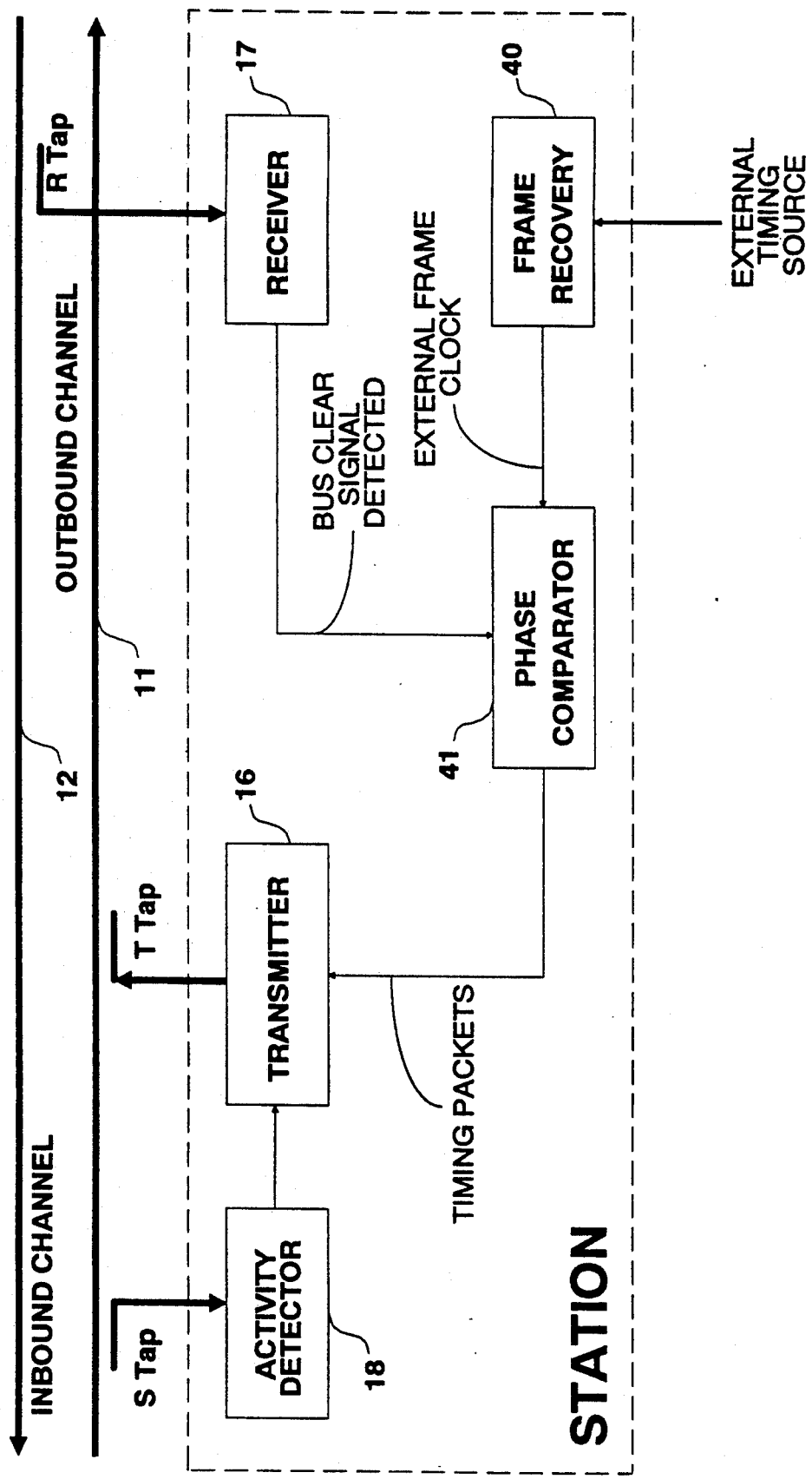
Figure 15:
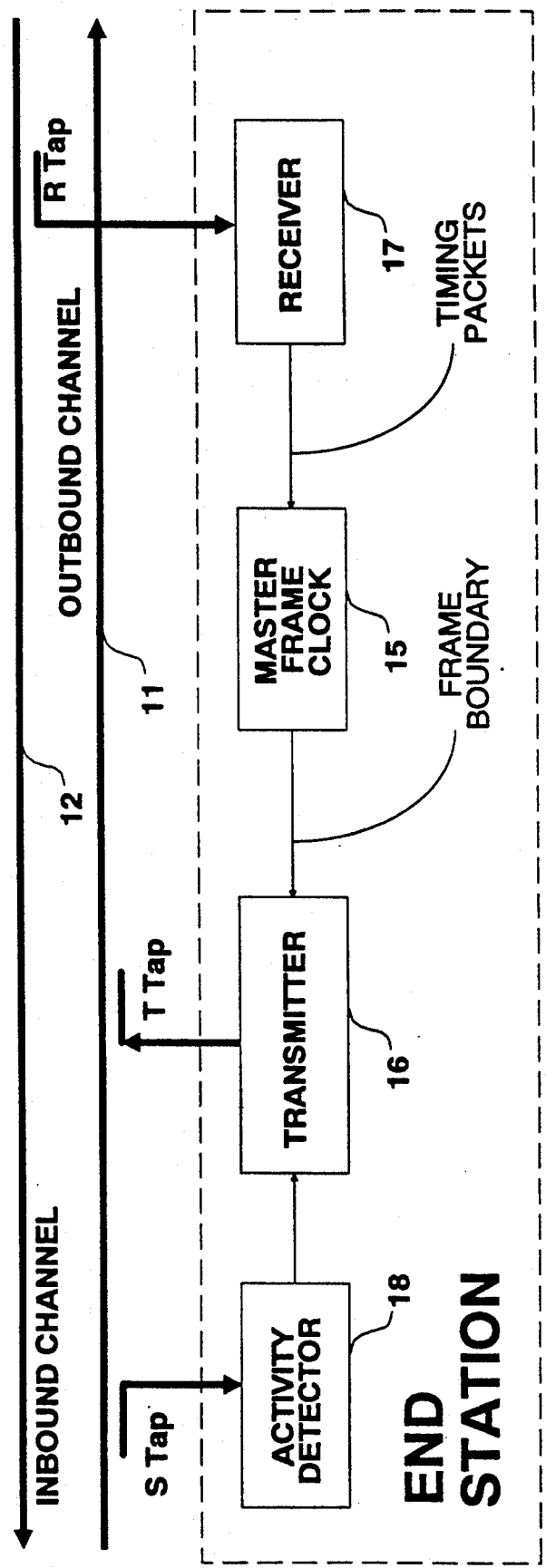
Figure 16:
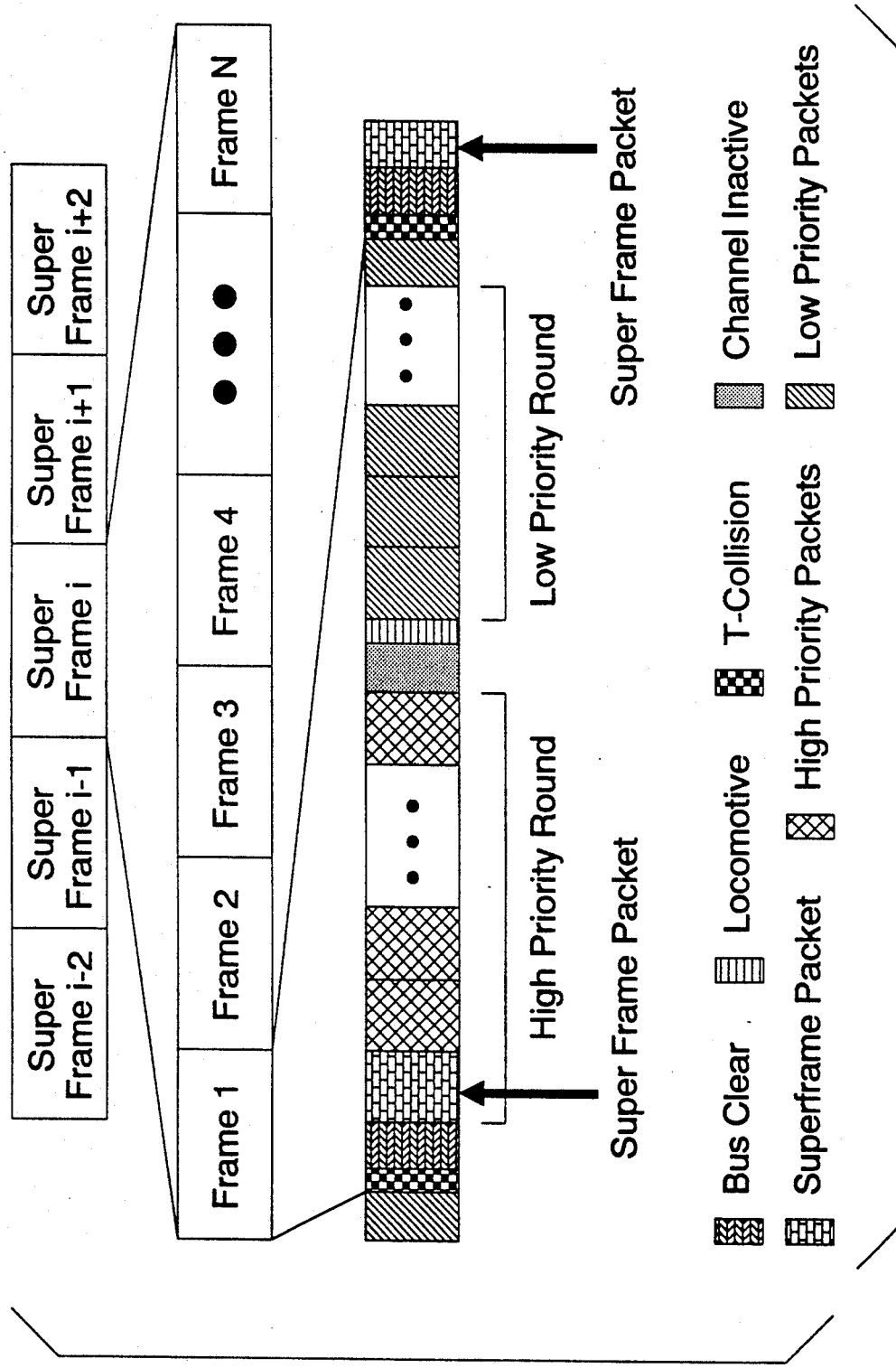
Figure 17:
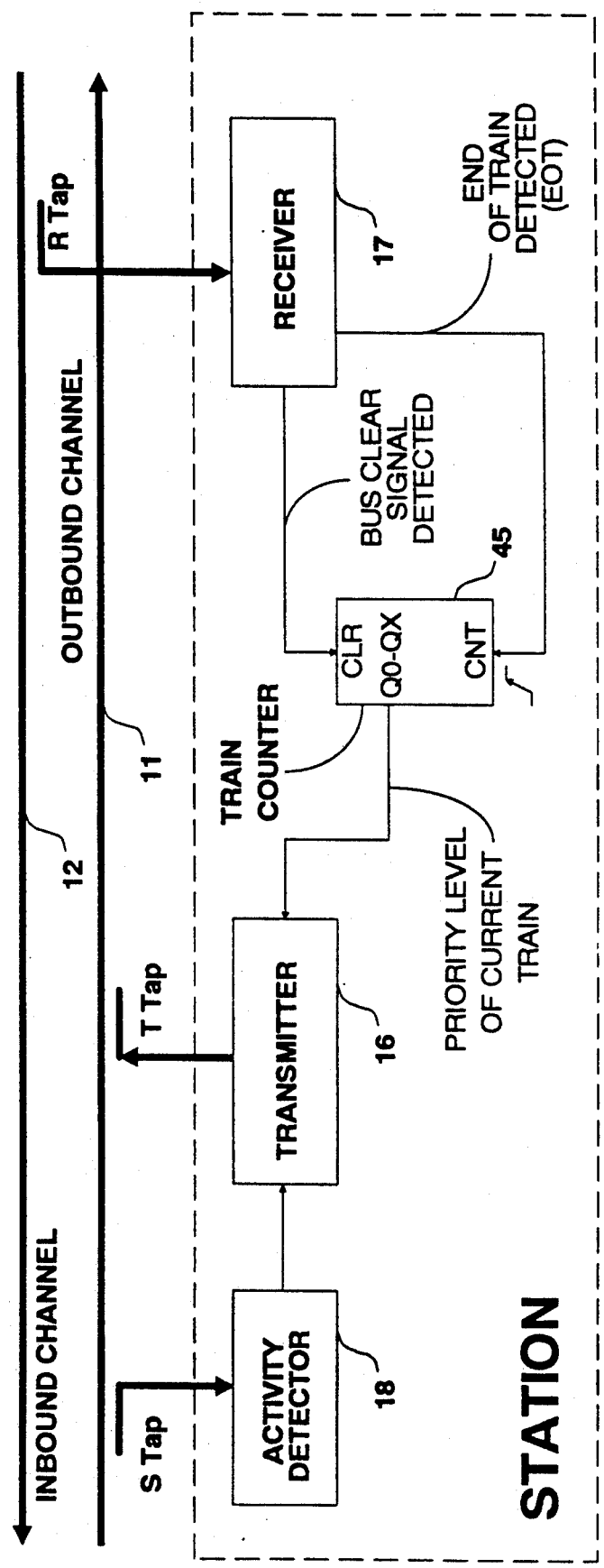
Figure 18:
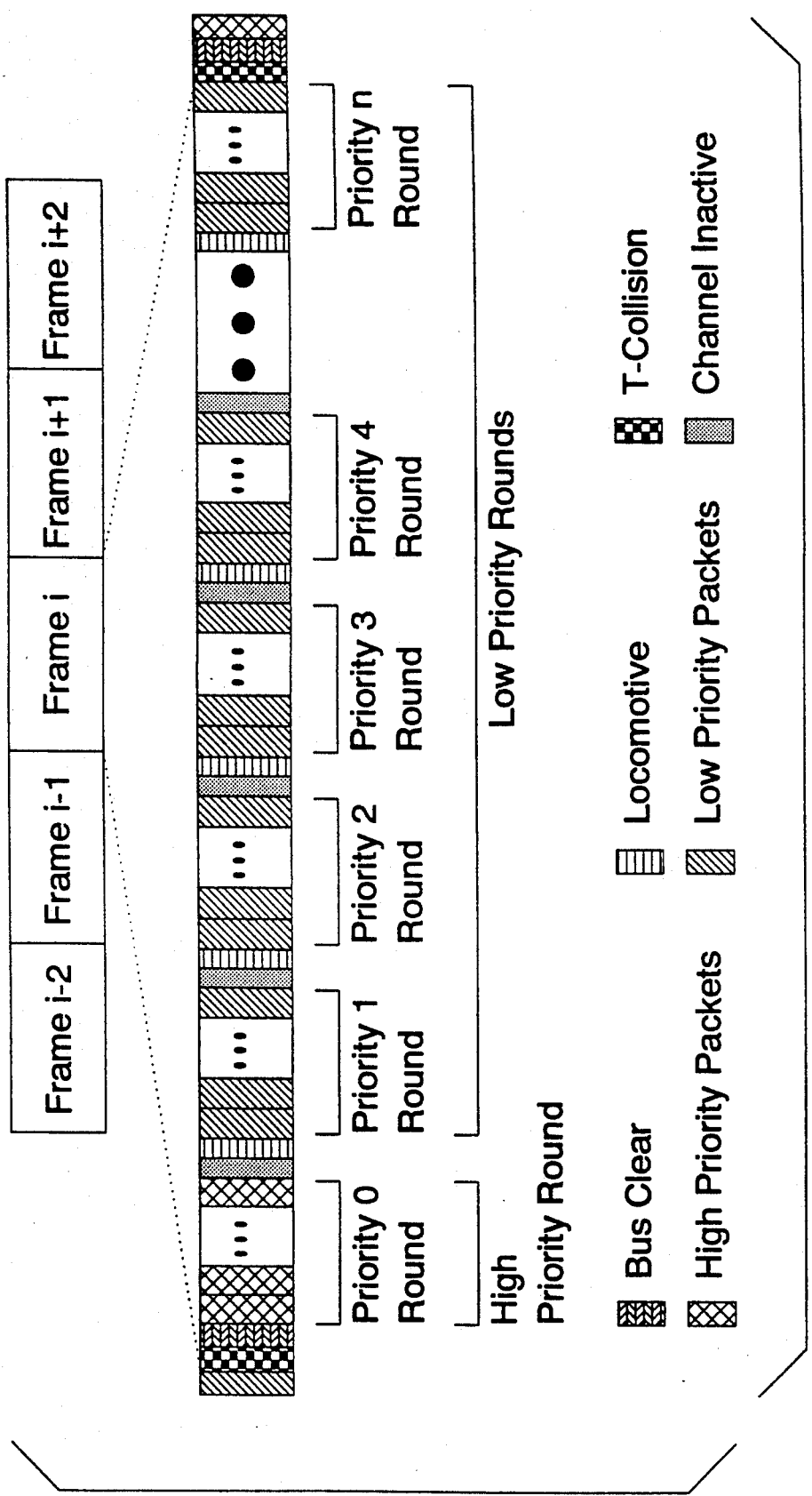
Figure 19:
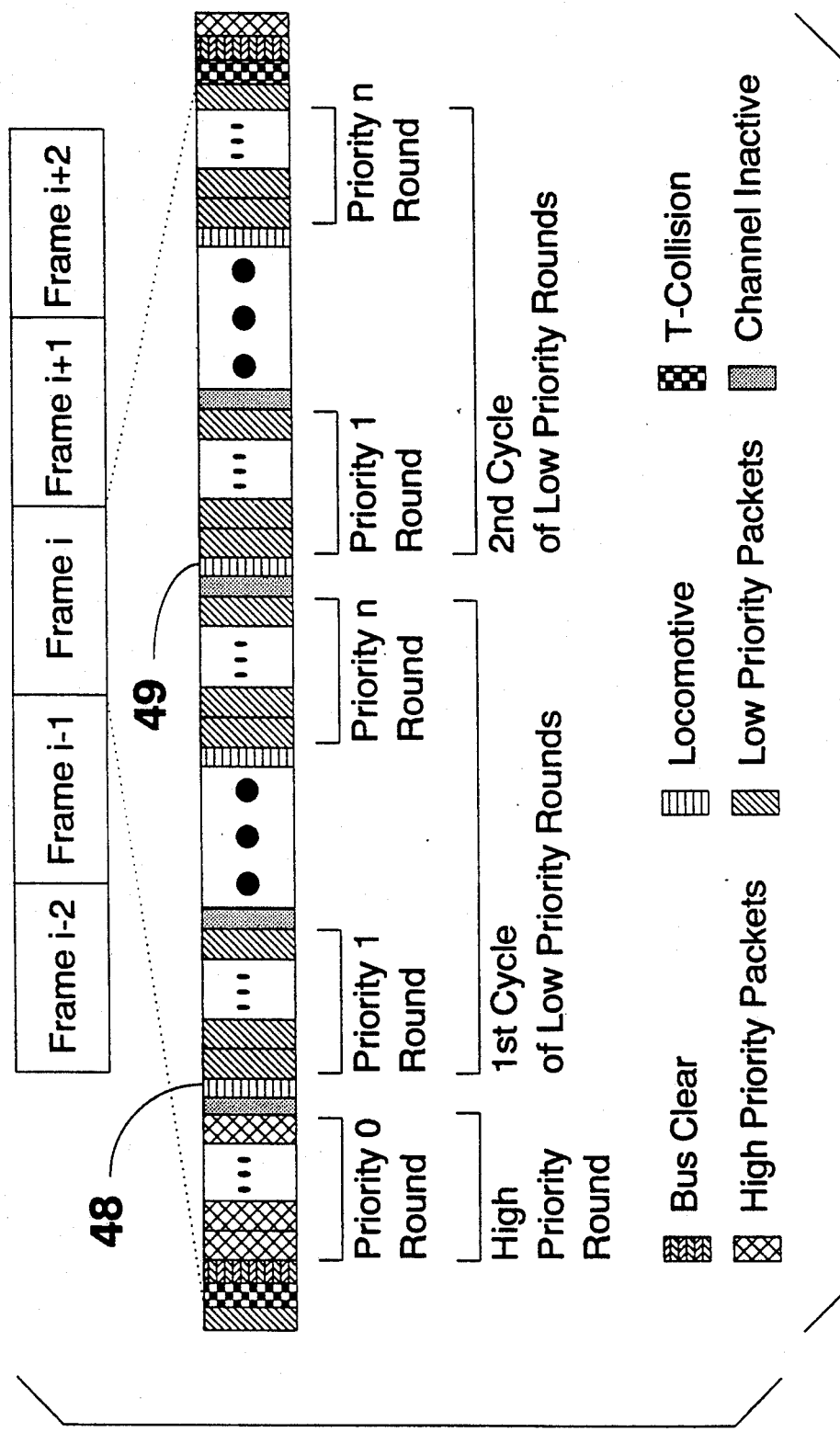
Figure 20:
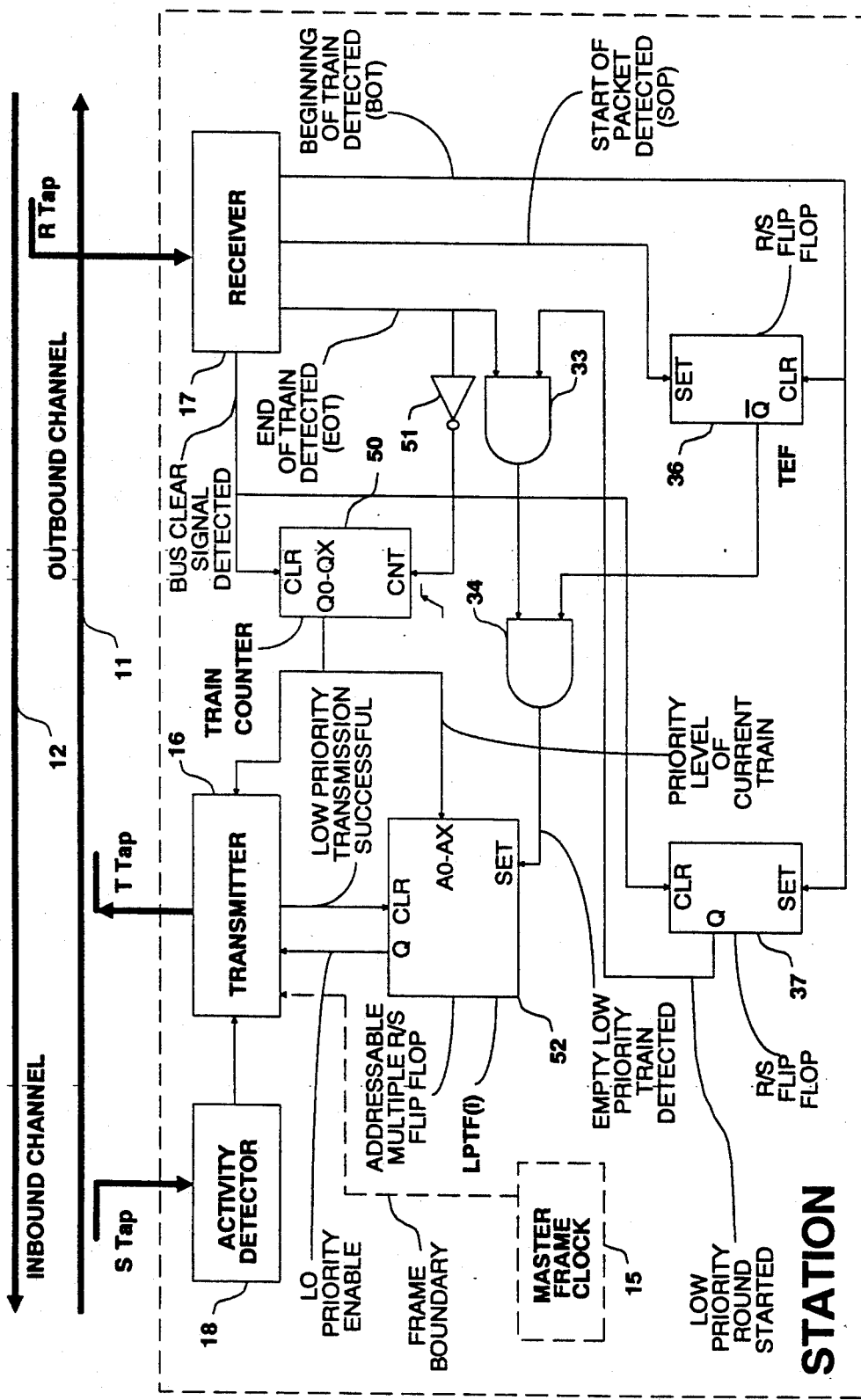
Figure 21:
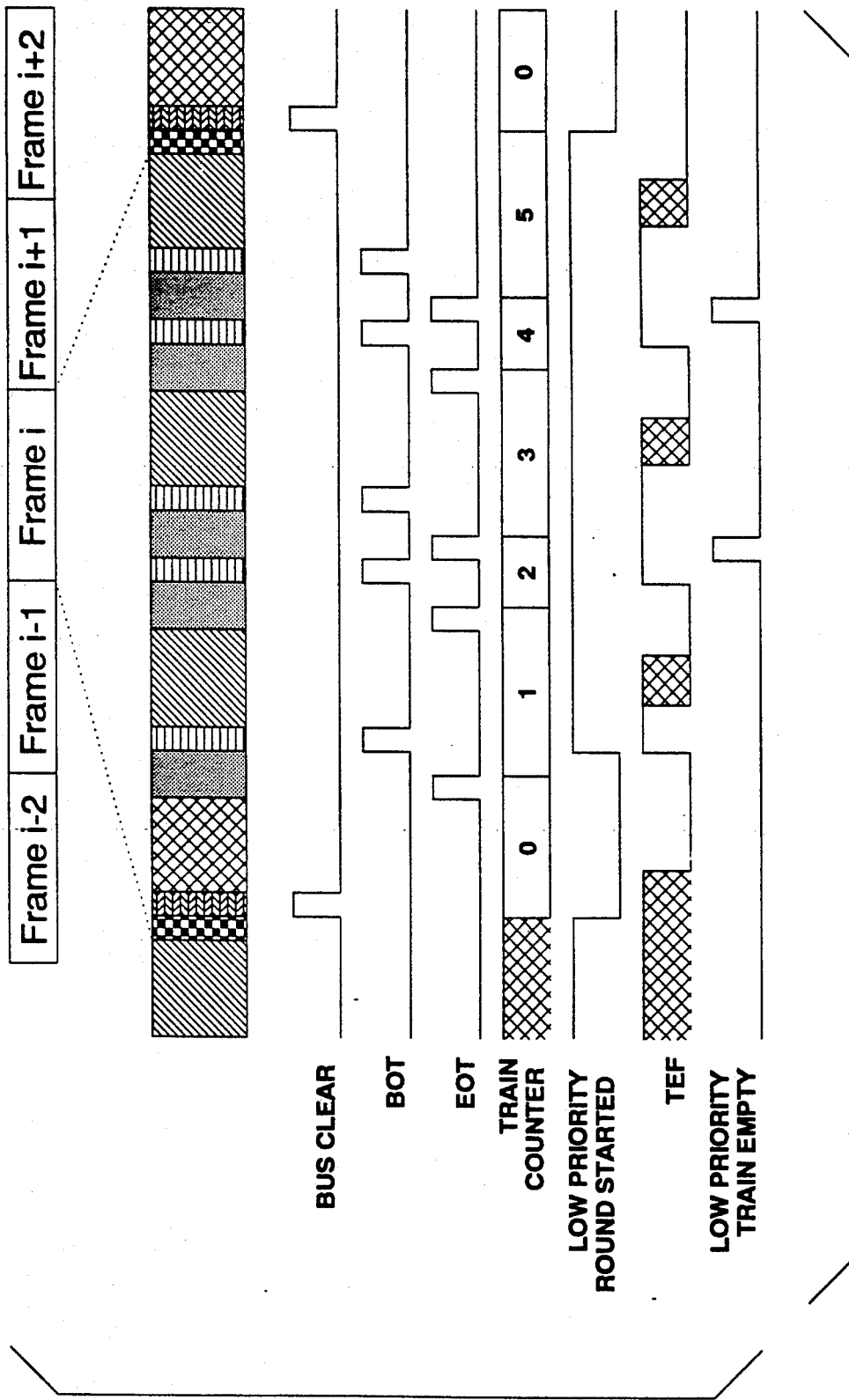
Figure 23:
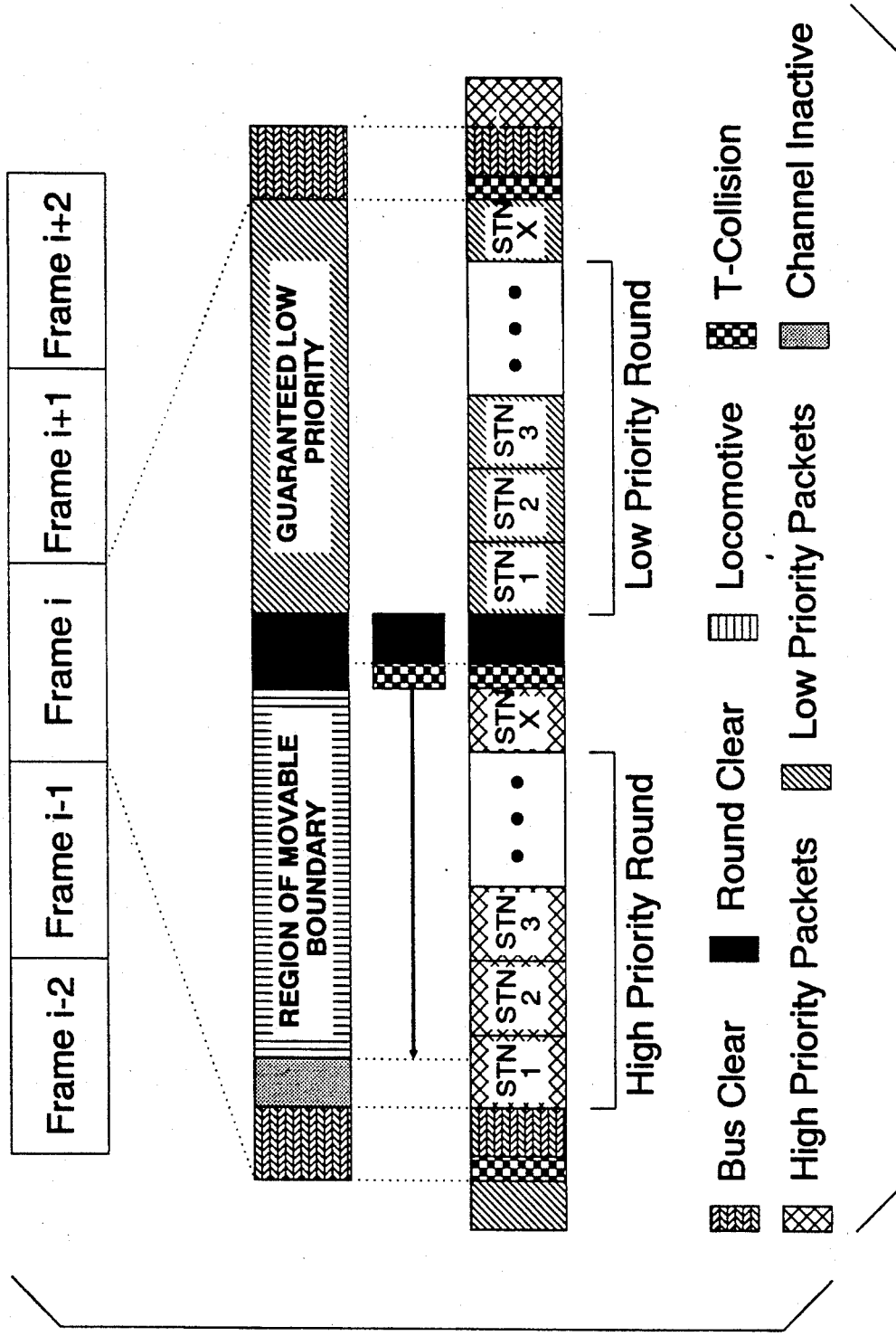
Figure 24:
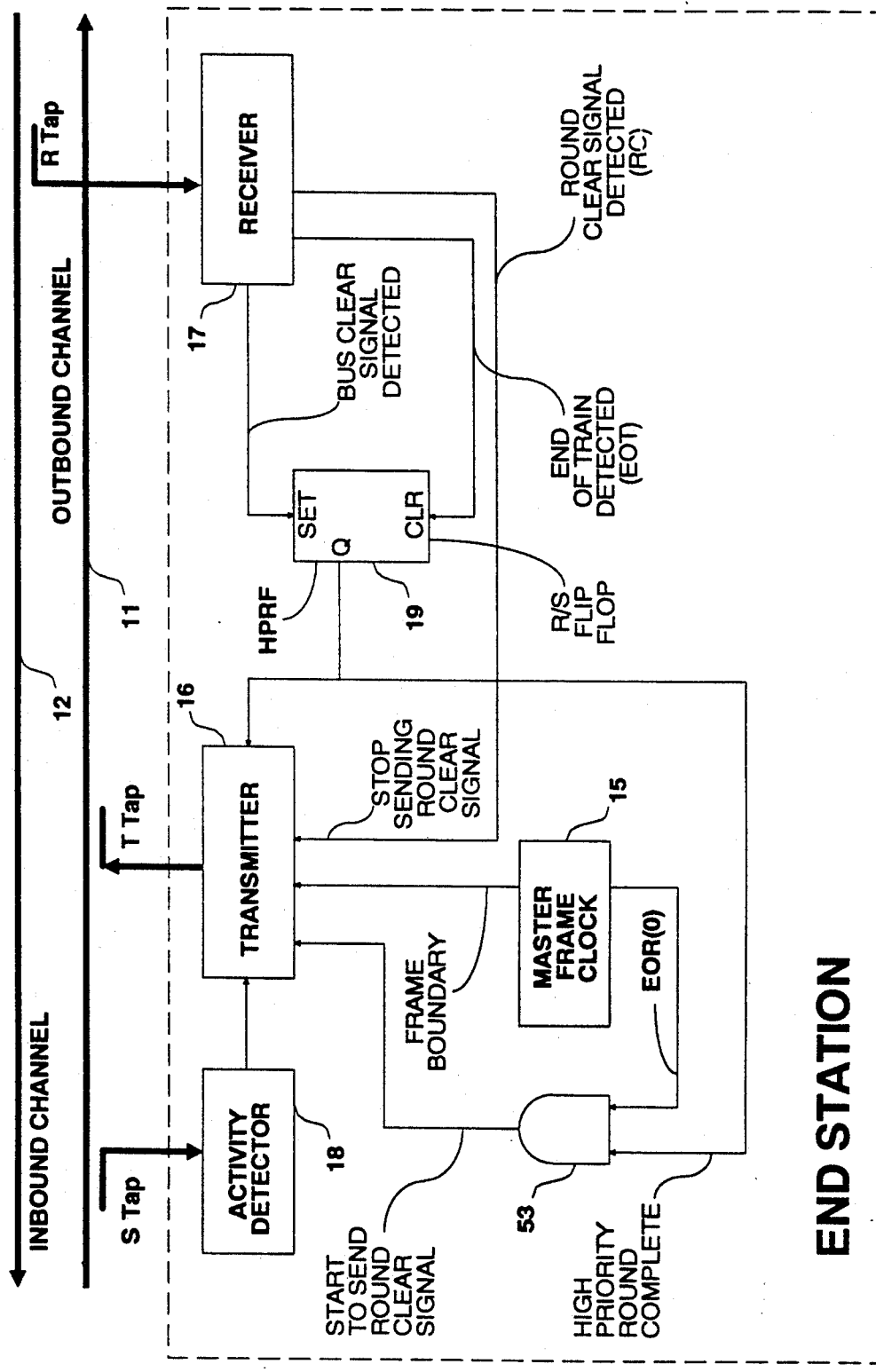
Figure 25:
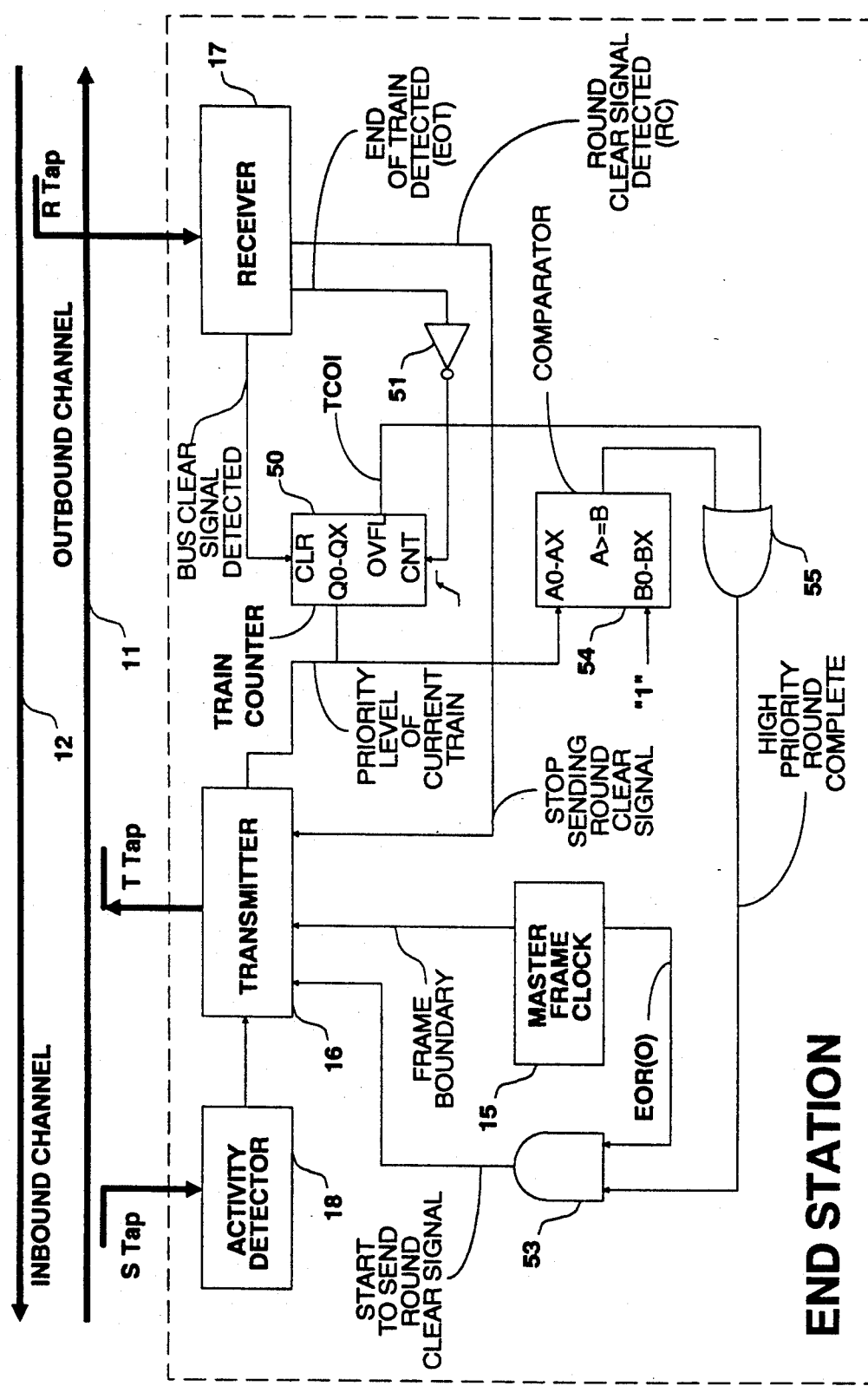
Figure 26:
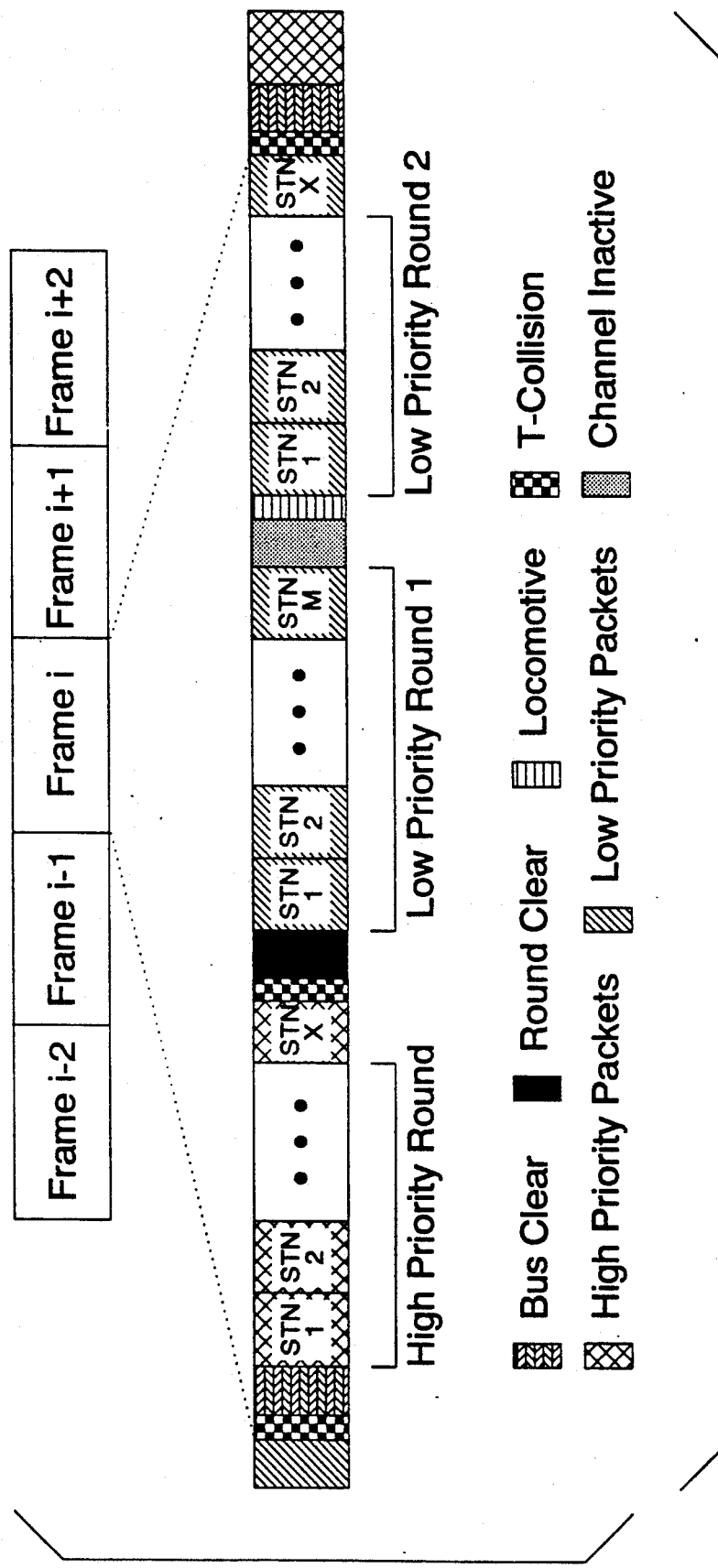
Figure 27:
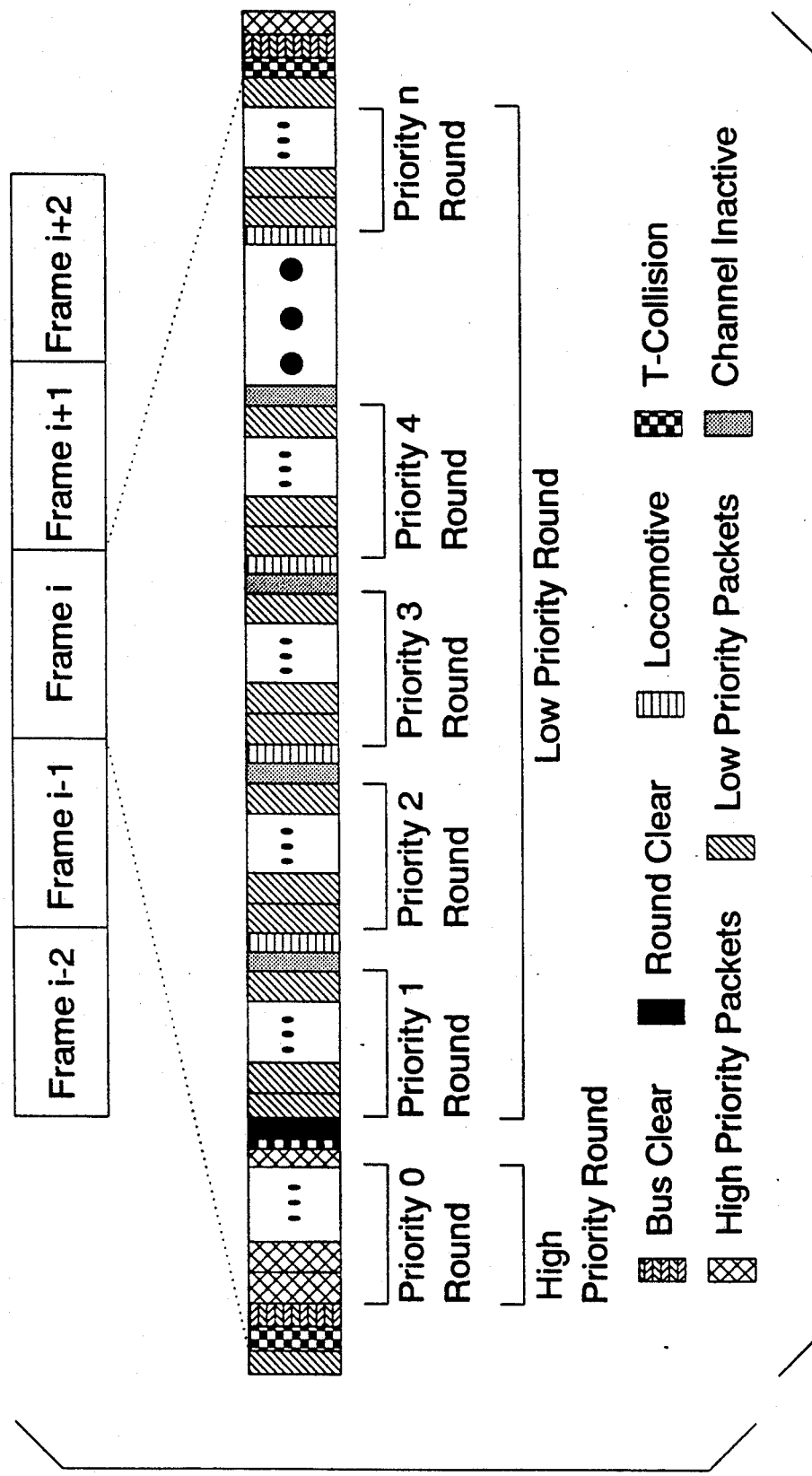
Figure 28:
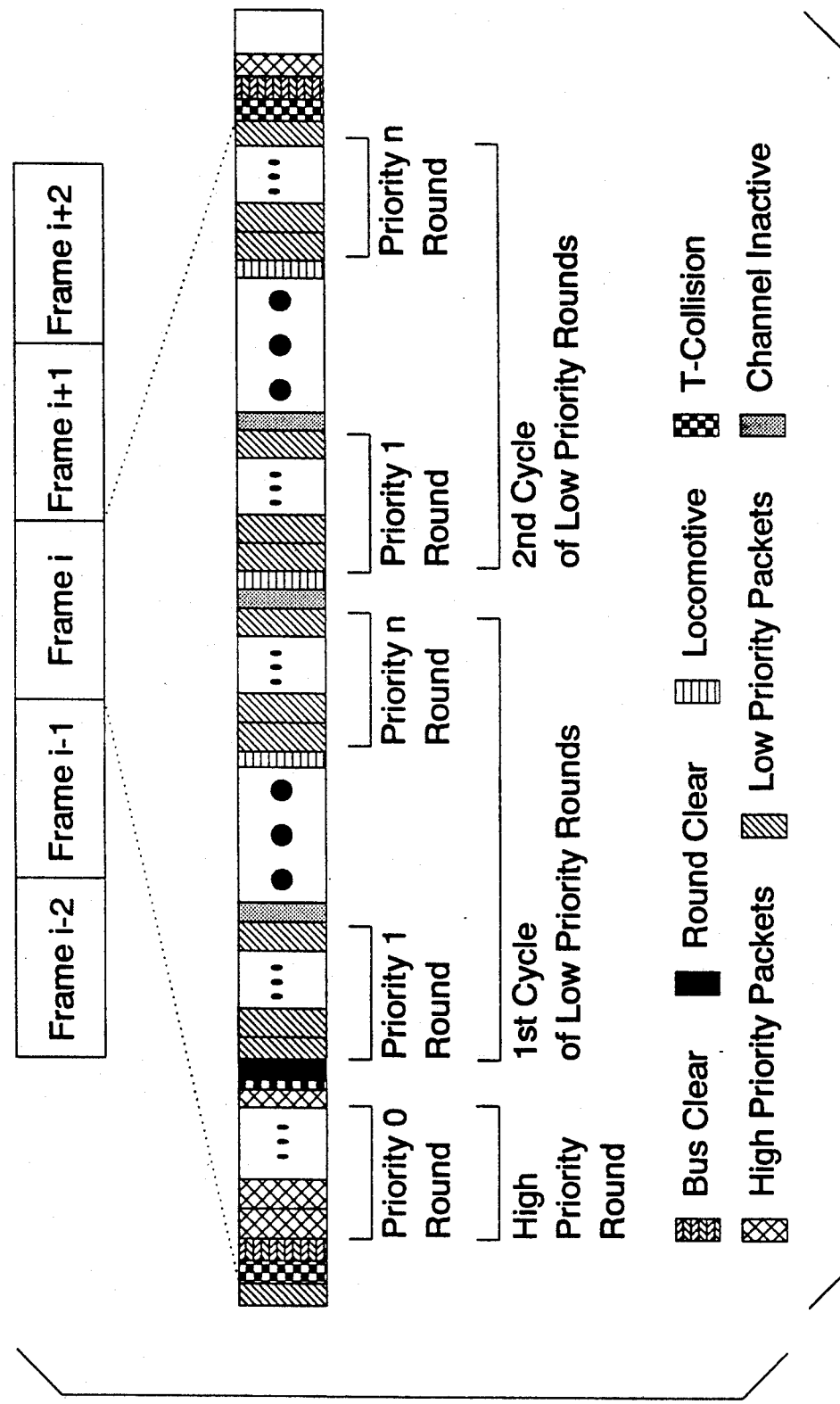
Figure 29:
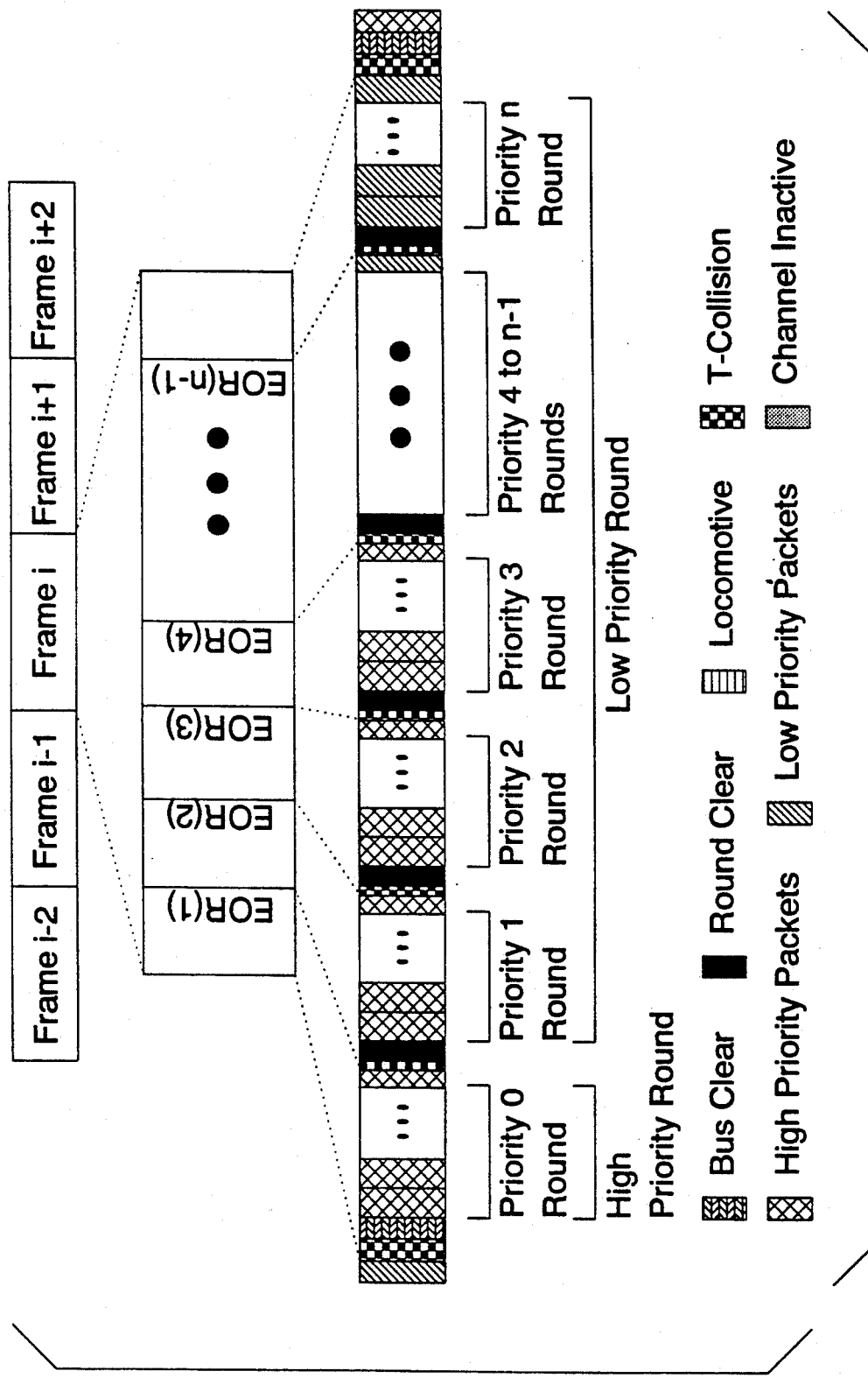
Figure 30:
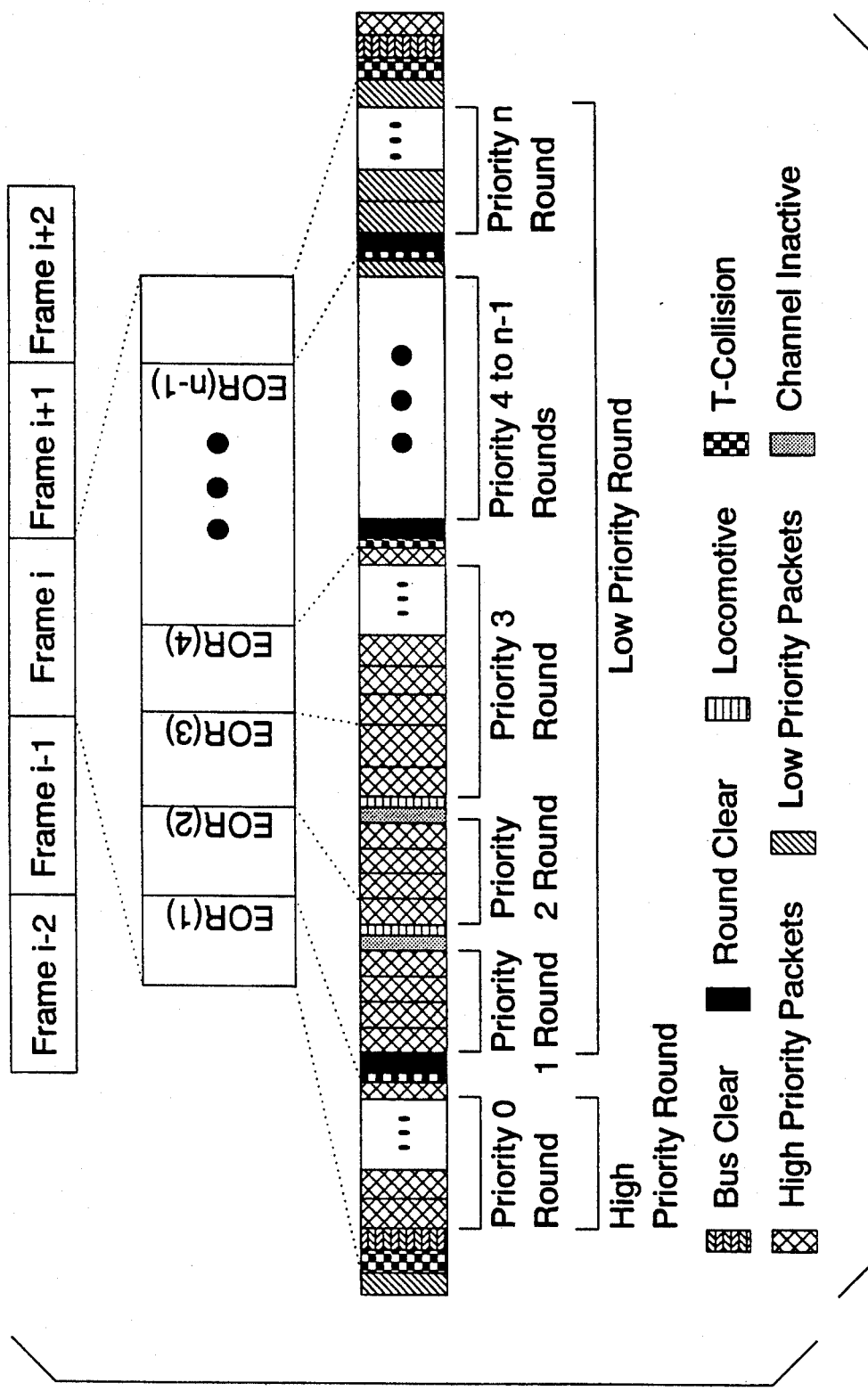
Figure 31:
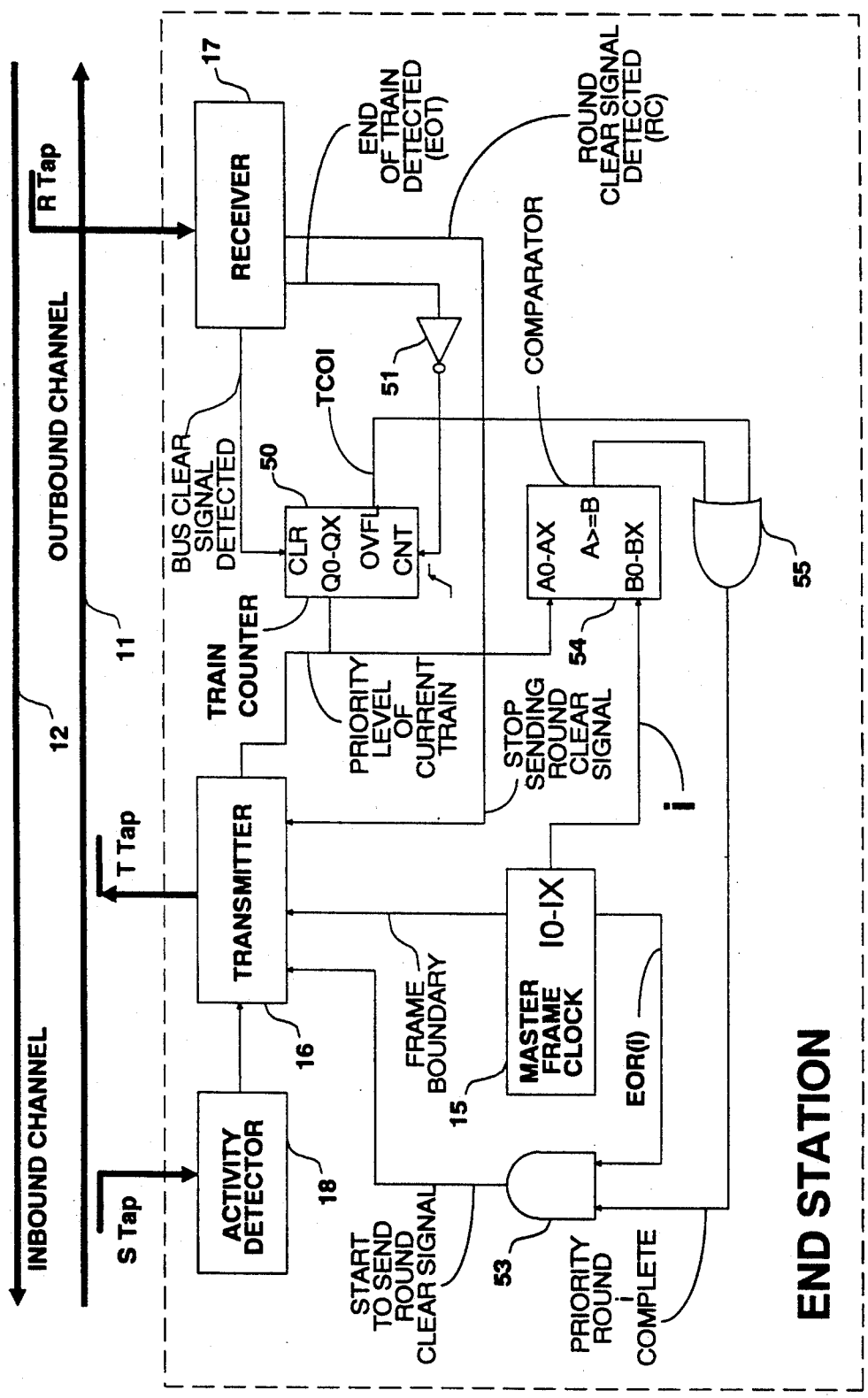

A better understanding of the invention will be obtained by reading the detailed description below, in connection with the following drawings, in which:

FIG. 1 is a block diagram of one type of system in which the invention can be used, FIG. 2 is a block diagram of another type of system in which the invention can be used, FIG. 3 is a block diagram of a third type of system in which the invention can be used, FIGS. 4A and 4B are block diagrams of a fourth and a fifth type of system (an alternate form of that shown in FIG. 1) in which the invention can be used, FIG. 5 is a representation of a packet train constructed using Attempt-And-Defer Access Contention Protocol, FIG. 6 is a block diagram of a portion of the systems show in FIGS. 1 and 2, showing use of a delay element in association with a station, FIG. 7 is a block diagram illustrating some elements of stations used in the invention, FIG. 8 is a signal diagram illustrating termination of a low priority train by a T-collision, FIG. 9 is a signal diagram illustrating termination of a later low priority train by a T-collision, FIG. 10 is a signal diagram illustrating two retransmission options for low priority T-collided packets, FIG. 11 is a signal diagram illustrating retransmission of low priority packets when the high priority payload is at a maximum and a low priority packet is retransmitted in the high priority train of a frame, FIG. 12 is a block diagram illustrating the elements of stations for providing a round robin for low priority packets, FIG. 13 is a signal and timing diagram used to explain the operation of FIG. 12, FIG. 14 is a block diagram illustrating the elements of stations to obtain phase locking of stations with the master frame clock in an end station, FIG. 15 is a block diagram illustrating some elements of the end station for locking the master frame clock to a timing source, FIG. 16 is a signal diagram illustrating superframes, FIG. 17 is a block diagram illustrating the elements of stations used for multiple low priority classes of signals without round robin, FIG. 18 is a signal diagram illustrating frame structure having multiple low priority rounds, FIG. 19 is a signal diagram showing two multiple low priority sounds, FIG. 20 is a block diagram of a station showing the elements of stations used for multiple low priority classes of signals with round robin, FIG. 21 is a signal and timing diagram used to describe operation of the station structure shown in FIG. 20, FIG. 22 is a chart illustrating examples of successive priority rounds for several priority classes in 31 successive frames, FIG. 23 is a signal diagram illustrating a round clear signal terminating a high priority round, FIG. 24 is a block diagram of an end station illustrating the elements of the system used for a dual priority network using round clears, without round robin, FIG. 25 is a block diagram of an end station illustrating the elements of the system used for a dual priority network using round clears, with round robin, FIG. 26 is a signal diagram illustrating operation of a two priority (i.e. high plus single low priority) network in which round clear is employed, FIG. 27 is a signal diagram illustrating operation of a multiple priority (i.e. high plus multiple low priority) network in which round clear is employed, FIG. 28 is a signal diagram illustrating operation of a multiple priority network in which round clear is employed, FIG. 29 is a signal diagram illustrating operation of multiple priority rounds terminated by round clears, FIG. 30 is a signal diagram illustrating operation of some multiple priority rounds, some of which are terminated by round clears, and FIG. 31 is a block diagram of an end station illustrating the elements of the station for multiple round clears without round robin.

DESCRIPTION OF THE INVENTION

The present invention may be applied to networks having the following topologies:

Single Unidirectional Broadcast Systems (SUBS) with a single fold (i.e. D or C shaped, such as the well known MAP and D-Net shown in FIG. 1 or FIG. 4A or FIG. 4B).

Single Unidirectional Broadcast Systems (SUBS) with a double fold (i.e. S or Spiral shaped), such as the well known Expressnet shown in FIG. 2, Dual Unidirectional Broadcast Systems (DUBS), such as the well known Fasnet and U-Net shown in FIG. 3.

The following description of the invention is made with respect to a network having a D shaped SUBS topology, as an example. The method and structure of the invention may be adopted for use in networks with other topologies as noted above. A wide variety of media and associated transmission techniques may be used by the invention to provide the unslotted unidirectional broadcast channels. The unslotted network channel may be provided by asynchronous transmission means or by synchronous transmission means. Usually, the inbound and outbound channels are provided in separate mediums, requiring the connection of stations to two mediums, one for each channel. In some systems both channels may be provided by a single medium, requiring that stations be connected only to a single medium. When both channels are provided in the same medium, connections required to both the inbound and outbound channels are made to the same physical medium, the two channels being provided by any multiple access (multiplexing) technique, such as for example any of the following techniques: synchronous or asynchronous time division multiple access, frequency division multiple access, code division multiple access, or as in the case of optical lightwave systems wavelength division multiple access.

The network is comprised of a plurality of stations 10 attached to a D shaped Unidirectional Broadcast System (UBS) that has two channels, an outbound channel 11 and an inbound channel 12 that are connected together as shown in FIG. 1. As in Expressnet, C-Net and D-Net, each station is attached to the UBS by the use of three taps, the R (receive) tap, the T (transmit) tap and the S (sense) tap as shown in FIG. 1.

Note that channels A and B 56 of the DUBS topology shown in FIG. 3 perform the combined function of the outbound channel 11 and inbound channel 12 in an SUBS topology.

Although FIG. 1 shows the order of attachment of R taps on the inbound channel to be the same as the attachment on the S and T taps on the outbound channel, this is not necessary. The order of attachment of R taps need not correspond to the order of the S and T taps provided that the end station, the station most upstream of the outbound channel and most downstream of the inbound channel (i.e. station 10 containing a circled 1 in FIG. 1), receives signals from the inbound channel following every other station. Consequently, the R taps of stations may be attached to corresponding distinct inbound channels, each of which carries the signals transmitted on the outbound channel, by use of a star coupler 13 and/or active amplifier, provided that the delay along the inbound channel to the end station (i.e. station 10 containing a circled 1 in FIG. 4A) from the star coupler/amplifier is greater than that to any other station as shown in FIG. 4A. The open ring configuration as used in D-Net and shown in FIG. 4B and others may also be used.

The R tap of each station is attached to the inbound channel of the UBS. Each station includes a receiver that is attached to the R tap and is used to receive packets and to detect other events such as the end-of-packet-train (EOT), beginning-of-packet-train (BOT), and arrival of bus clear signal (BC) events on the inbound channel of the UBS.

The T tap of each station is attached to the outbound channel of the UBS. Each station includes a transmitter that is attached to the T tap and is used to transmit packets and other signals, such as the bus clear signal (in the case of the most upstream controlling station), on the outbound channel of the UBS.

The S (sense) tap of each station is attached to the outbound channel of the UBS upstream of the station's T tap (i.e. in the direction from which transmissions arrive at the T tap on the UBS) and downstream of the preceding station's T tap, as shown in FIG. 1. Each station includes an activity sensor that is attached to the S tap and is used to detect the presence of transmissions from upstream stations on the outbound channel of the UBS.

The operation and structure of the invention will now be described with reference to particular kinds of signals. While reference will be made to FIG. 1 as an example, other systems such as those shown in FIGS. 2-4 may be used instead.

1.0 TRANSMISSION OF A SINGLE LOW PRIORITY CLASS AND HIGH PRIORITY CLASS OF DATA PACKETS

In this most basic mode of operation the network transmits data packets in two priority classes, a class for high priority packets and a class for low priority packets. Each station maintains a separate transmit queue for packets within each priority class. Each station may maintain separate receive queues for packets within each priority class or a single queue for all received packets.

1.1 NETWORK OPERATION USING THE BUS CLEARING METHOD

The station that is the most upstream on the outbound channel of the UBS (station 1 in FIG. 1) is referred to as the end station. The end station, upon detecting an end-of-train (EOT) event at its R tap on the inbound channel, generates a locomotive signal (referred to below merely as "locomotive") at its T tap on the outbound channel. This locomotive may consist of unmodulated carrier, modulated carrier that can be distinguished from a packet transmission and/or the transmission of one or more packets.

Stations downstream of the end station on the outbound channel use the known Attempt-And-Defer Access Contention Protocol (AADACP) to transmit packets on the outbound channel.

AADACP operates as follows. To transmit a packet (or packets), a station waits for the end-of-carrier event (EOC) which is detected by an activity detector attached to its S tap. On detecting the EOC the station starts transmitting a packet preamble. If the station's activity detector detects a transmission from the upstream stations while it is transmitting this preamble, the station aborts the packet transmission thereby deferring to the upstream station. The station will attempt to transmit the packet again when it detects the next EOC. Otherwise, it transmits the data packet(s) after the preamble. This detection of EOC without detection of a further transmission within a preamble transmission time is an implicit token that each station uses to acquire the access right to transmit a packet (or packets) in the outbound channel.

This causes packets to be transmitted sequentially on the outbound channel following the locomotive transmitted by the end station. The concatenated stream of packets created in this manner is referred to as a packet train. The packets in a packet train created by AADACP are separated by idle periods of length $T_d$ where $T_d$ is the time for a station to detect EOC and start a transmission.

In addition the first $T_d$ of the preamble of each packet in the train may consist of many overlapped transmissions due to stations attempting to gain the access right. These regions of overlapped transmission are referred to as Preamble Collisions or P-Collisions. A packet train created using AADACP is shown in FIG. 5, with one packet exploded. Note that this and all following UBS activity diagrams in this section have the following properties; the signal activity shown is as seen at any R tap; signals on the left are received before those on the right (i.e. signal flow at a station is seen by scanning from the left to the right); frame i−1 precedes frame i in time sequence.

It may be seen that there is first a locomotive followed by a bus idle interval followed by a packet. The packet is comprised of a preamble having a first portion which may be overwritten by collisions, followed by a portion which is uncorrupted. The preamble is followed by a start of packet indicator, the body of the packet, and an end of packet indicator. The body of the packet is comprised of address and control data followed by the packet data followed by an integrity (e.g. CRC) check. Other means, not part of this invention, may provide for reducing or eliminating the bus idle interval and reducing or eliminating the overwritten portion of the preamble.

Eventually all of the stations having data to transmit will have transmitted packets in the train on the outbound channel and the end of the train will propagate to the end station's R tap. When the end station's receiver detects the end-of-train (EOT) condition on the inbound channel, the end station transmits a locomotive on the outbound channel to restart the train building process. In this manner the end station generates a sequence of packet trains on the UBS onto which network stations may append packets.

In another bus structure shown in FIG. 6, signal delay element 14 is inserted in the outbound channel between the S and T tap of each station. This delay can be used to adjust the timing between packet bodies.

In accordance with this invention, in order to remove traffic from the UBS and to allow a new priority cycle to begin, the end station transmits a bus clear signal at regular time intervals that corresponds to a predetermined network frame time. In order to achieve this the end station is provided with a suitably stable timing source called the Master Frame Clock (MFC). FIG. 7 illustrates a block diagram of the end station, with the master frame clock 15 in dashed lines included but the S tap and activity detector shown should be excluded. FIG. 7 is also illustrative of a block diagram of a non-end station, which is comprised of all of the solid line blocks (the master frame clock 15 excluded).

The MFC in the end station produces a signal at regular time intervals. This signal indicates the beginning of a new frame in the network, and the time interval between such signals establishes the duration of network frames. When the end station's MFC produces and applies to transmitter 16 a timing signal that indicates a frame boundary, the end station's transmitter 16 starts to transmit a bus clear signal on the outbound channel 11. This signal collides with all packets being transmitted, and with the stations using the AADACP protocol, they stop transmitting. This empties the UBS of all traffic and traffic resumes only when the end station stops transmitting the timing signal. The details of this process are described below.

The duration of the bus clear signal must be long enough to ensure its recognition by all of the station receivers (attached to the R taps on the inbound channel) before the end station stops transmitting it, thus allowing a new EOC to propagate along the outbound channel.

In order to ensure that the bus clear signal is transmitted for a long enough time, the end station may use one of two procedures as follows.

1. The end station stops transmitting the bus clear signal when its receiver 17 detects the arrival of the bus clear signal at its R tap on the inbound channel. This guarantees that the first station downstream of the end station will detect the bus clear signal on the inbound channel before it detects the EOC created when the end station stops sending the bus clear signal. This is the preferred method.

2. The end station may transmit the bus clear signal for a fixed period of time. This time period must be longer than the propagation delay between the end station's T and R taps on the UBS plus the worst case time for a station to detect the bus clear signal (as we shall see later in the presence of a T-Collision). This alternative is somewhat simpler to implement since the transmission of the bus clear signal can be controlled by a simple timer/counter. However, in this case either the network propagation delay must be determined by the end station, or a worst case value for the propagation delay must be used. If the end station is to determine the network propagation delay some complexity is introduced in the end station, while the latter alternative has an adverse impact on the network's performance since the value used is always longer than the actual propagation delay. For these reasons this alternative is not preferred although it may be useful in some circumstances.

Two situations may arise when the end station begins to transmit a bus clear signal and the signal propagates along the outbound channel.

Situation 1: The bus clear signal may pass all of the stations on the outbound channel while none of the stations are transmitting packets in the outbound channel.

Situation 2: The bus clear signal may arrive at a station that is in the process of transmitting a packet in the outbound channel.

In situation 1, the bus clear signal is detected by all the station receivers either appended to the end of the last packet in the previous train (low probability case), or following the end of the last packet train (EOT) after a period of bus inactivity. The time during which the UBS is detected as inactive by any receiver is referred to as an idle period.

It should be noted that the maximum duration of this idle period, as seen by any receiver tap, is equal to the UBS propagation delay between the end station's T and R taps plus the time that it takes the end station to detect EOT and start to transmit a locomotive on the outbound channel. All idle periods have this maximum duration unless a frame boundary occurs, causing the end station to transmit a bus clear signal during such an idle period, thus reducing its duration. Although unlikely, the idle period may be reduced to zero, in which case the bus clear signal becomes appended to the end of the previous packet train. If the frame boundary occurs before the commencement of an idle period, then situation 2 occurs.

In situation 2, the bus clear signal arrives at one of the stations while it is transmitting a packet. This station will sense the arrival of an upstream transmission at its S tap activity detector 18 (the S tap activity detector 18 is referred to below merely as the S tap) senses only bus activity and cannot recognize the bus clear signal and stop its transmission, thus deferring to the upstream signal. When this occurs the beginning of the bus clear signal and the end of the station's packet transmission will overlap by the amount of time that it takes the station to sense the arrival of the bus clear signal and stop transmitting. This is referred to as a Truncating Collision, or T-Collision. The period of overlap caused by the T-Collision causes both the end of the packet that the station was transmitting and the beginning of the bus clear signal to be corrupted. When a station detects a T-Collision during a packet transmission it reschedules the packet for transmission at a later time.

In each station, as illustrated in FIG. 7 the receiver 17 detects both the presence of the bus clear signal and the end of train event. The receiver 17 activates its bus clear detected output for the duration when it detects the presence of a bus clear signal and activates its end of train detected output for a short duration when it detects an idle period of suitable duration (longer than $T_d$ but shorter than the bus propagation delay from the end station's T to S tap). A bus clear signal detected output is applied to the Set input of flip-flop 19, while the end of train detected signal is applied to the Clear input of flip-flop 19. The Q output of the flip-flop, labelled HPRF, is applied to an Enable input of transmitter 16. As will be noted below, the HPRF output is a high priority round presence indicator.

It should be noted that stations that are downstream of a station that detects a T-Collision in situation 2 will not receive the access right to transmit on the outbound channel until they detect the EOC that is created when the end station stops transmitting the bus clear signal. The bus clear signal blocks the ability of these downstream stations to acquire the access right in the current low priority round.

Eventually the bus clear signal propagates onto the inbound channel and is detected by all the station receivers. In situation 2 the station receivers will detect that the packet preceding the bus clear signals has suffered a T-Collision and will discard the packet. When a station receiver detects the arrival of the bus clear (BC) signal on the inbound channel the station sets an internal flag called the High Priority Round Flag (HPRF) by setting flip-flop 19. Each station resets its HPRF (clears flip-flop 19) when its receiver detects the next end-of-train condition (EOT) on the inbound channel.

A station's transmitter 16 may only transmit high priority (e.g. synchronous time division multiplex (STDM)) packets when the station's HPRF flip-flop 19 is set and may only transmit low priority (e.g. asynchronous time division multiplex (ATDM)) packets when the HPRF flip-flop 19 is not set (cleared).

Thus when the receiver 17 detects the bus clear signal, it sets flip-flop 19 which causes its Q (HPRF) output to go high. Transmitter 16 is thus enabled only to transmit high priority packets from a high priority queue. On the other hand, when receiver 17 detects an end of train, it applies a signal to the clear input of flip-flop 19, causing the HPRF lead to go low. This causes transmitter 16 to only feed low priority data signals to the outbound channel 11 of the bus from a low priority queue.

High priority packets can thus be transmitted only when the HPRF is set. Thus, high priority packets will be transmitted only in the train that follows a bus clear signal and low priority packets will be transmitted in all other trains. The bus clear signal is used to restart a new priority cycle or frame, terminating any low priority round that is in progress by colliding with it, and starting a new high priority round at fixed frame intervals determined by the period of the end station's MFC.

Eventually the bus clear signal is detected by the end station at its R tap. When this occurs the end station sets its HPRF flip-flop 19. When the end station sets its HPRF in this manner it is assured that all of the other stations in the network have also set their HPRF flip-flops since all the other stations will have detected the bus clear signal before the end station. The end station's transmitter then stops transmitting the bus clear signal and, since its HPRF flip-flop is set, appends to the end of it any high priority packets that are in its queue. The end of this transmission (EOC) constitutes a new locomotive on the outbound channel. Stations then use AA-DACP to append packets into the train started by this locomotive. However, since the HPRF flip-flop of each station in the network was set by the bus clear signal, each station will transmit only high priority packets in this train. This packet train is therefore referred to as a high priority train.

Eventually all of the stations with high priority packets will have transmitted them in the high priority train and the end of this train will propagate along the inbound channel where it will be detected by the end station (EOT). When this occurs the end station resets its HPRF flip-flop. When this occurs it is assured that all of the other stations in the network have also reset their HPRF flip-flops since all the other stations will have detected the EOT before the end station. The end station then transmits a locomotive on the outbound channel to start a new train and, since its HPRF flip-flop is reset, it will transmit any low priority packets in its queue as, or appended to, this locomotive. Stations then use AADACP to append packets into the train started by this locomotive. However, since the HPRF flip-flop of each station in the network was reset by the EOT that caused the locomotive to be generated by the end station, each station will transmit only low priority packets in this and subsequent trains, until another bus clear signal causes their HPRF flip-flop to be set.

The first low priority train that follows a high priority train may be terminated due to the arrival of a bus clear signal generated at a frame boundary by the end station. This occurs if the duration of the high priority train plus the duration of the low priority train (plus the overhead caused by the transmission of the bus clear signal and the time for the end station to detect the end of the high priority train and generate the start of a low priority train) exceeds the frame duration. It should be noted that the end station itself may be transmitting a locomotive (which may include a low priority packet) when the master frame clock indicates a frame boundary. In this case the end station treats any packet that was in the process of transmission when this occurs as other stations would treat packets that have experienced a T-Collision. The end station retransmits such packets in the same manner as any other station as will be described below.

It should be noted that it is also permissible for stations to transmit high priority packets in the low priority round. This is also generally true in the multiple priority round schemes to be described later. That is, packets may be transmitted in any round that has a priority equal to or lower than the packet's priority. It should be noted that such transmissions may cause round robins of lower priority classes to be extended indefinitely unless the presence of higher priority packets in a round are ignored by the empty train detection aspects to be described later.

If the length of the high priority train is such that the time remaining in a frame for a low priority packet train is less than the time to transmit a packet, then all attempts by stations to transmit low priority packets will fail, since they will always encounter a T-Collision. In order to avoid this situation a high level control protocol must be employed to control the allocation of the time to transmit packets in the high priority train. Sufficient time must be reserved in the high priority train for the high priority packets transmitted by each station in the network. The high level control protocol must ensure that the length of the high priority train is such that there is at least enough time for one maximum length low priority packet to be transmitted in the remainder of the same frame (i.e. in the following low priority train). When the maximum capacity of the network is reached the high level control protocol denies further requests for reservations in the high priority train, effectively blocking additional high priority transmissions in the high priority train, thus preventing its length from increasing. This reservation guarantees that at least one low priority packet may be transmitted per frame. All of the packets that are currently being transmitted in the high priority train according to such reservations are referred to as the reserved payload in the high priority train.

If the duration of the high priority train and the following low priority train is less than the duration of the frame time, then the low priority train will end without a T-Collision and the and station detects the end of this low priority train at its R tap and transmits a locomotive to start a new low priority train. This locomotive will contain any low priority packet(s) that may have been in the end station's queue. Downstream stations will then append any low priority packets in their queues into this packet train using AADACP on the outbound channel. This process of low priority train regeneration continues until it is interrupted by the end station transmitting a bus clear signal at the next frame boundary. The situation where the second low priority train (that constitutes the second low priority round within a priority cycle in a frame) is terminated by a T-Collision is shown in FIG. 8 and the situation where a later low priority round is terminated by a T-collision shown in FIG. 9.

Turning to FIG. 8, it may be seen that a bus clear signal has its first portion corrupted by a T-collision, and a second portion which is not corrupted. The second portion is not corrupted since all stations will have terminated transmission upon detection of the bus clear signal. Subsequent to the bus clear signal the packets of each station in succession having a high priority signal are transmitted along the bus, followed by an inactive interval. A locomotive is then transmitted by the end station and passes along the bus, and is followed by a first low priority round of signals transmitted from each of the other stations. Following an inactive interval a second locomotive signal passes along the bus, followed by a second low priority round of signals. The signal from one of the stations, labelled station X, has its signal corrupted (at Y) because of a T-collision occurring due to transmission of another bus clear signal from the end station. A frame thus is defined between the beginnings of each of the bus clear signals, indicated by the dotted lines.

FIG. 9 illustrates an expansion of FIG. 8, wherein a multiplicity of low priority rounds follow the high priority round, each low priority round following a locomotive generated by the end station in response to an idle period detected as an EOT.

It should be noted that the end station will ignore the detection of an EOT at its R tap once it begins to transmit a bus clear signal since it cannot start a new low priority round at that time.

Thus the network generates a bus clear signal on the UBS at fixed intervals which divide the time on the UBS into a series of frames having fixed duration that is determined by the MFC in the end station. Each bus clear signal is followed by a single high priority packet train that constitutes a round for high priority packets. The duration of the packet train that constitutes this round is variable (up to a predetermined maximum size determined by a high level control protocol) and dependent on the volume of high priority traffic that is transmitted in each high priority round. This high priority train is followed by one or more low priority packet trains (some of which may be empty), that constitutes one or more rounds for low priority packets, until a low priority round is terminated and a new priority cycle is started with another high priority round by a bus clear signal at the next frame boundary.

It should be noted that the end of the high priority train constitutes a dynamically moving boundary between the high and low priority rounds in each frame. The position of this boundary depends on the packet payload in the high priority train.

1.2 RETRANSMITTING T-COLLIDED PACKETS

In the above description of the use of the bus clearing method, it is indicated that low priority packets that experience a T-Collision (in the end station or at other downstream stations) are retransmitted at a later time. Two options exist for this retransmission as described below. FIG. 10 provides an illustration of the signals for these two alternatives.

1.2.1 OPTION 1

The preferred option is to retransmit a T-Collided packet at the earliest possible opportunity. This occurs when the station's transmitter next receives the access right on the outbound channel. This always occurs when the station's HPRF flip-flop is set and the high priority packet train that follows a bus clear signal is being built on the outbound channel.

It may be seen in FIG. 10 (Retransmission Option 1) that the packet 30 has been terminated due to a T-collision, the corruption due to the overlap of the packet and bus clear signal transmissions being shown at 31. As indicated by the arrow, the low priority collided packet 30 is retransmitted as packet 32 at the end of the high priority packet train that immediately follows the bus clear signal, i.e. its retransmission has been given high priority.

When this option is used the state of the HPRF flag is ignored by a station's transmitter 16 when it is attempting to retransmit a low priority packet. Thus, such packets are always retransmitted in the high priority train that follows the bus clear signal that created the T-collision.

This causes the duration of the high priority train to increase by the transmission time of the retransmitted packet. This time varies with the length of the packet up to the time to transmit a maximum length low priority packet.

If the reserved payload in the high priority train is such that it has a much shorter duration than the maximum allowed, then the retransmitted packet will simply be transmitted a little earlier than it might otherwise have been without affecting the ability of other low priority packets to be transmitted in the low priority train(s) that follow in that frame. The retransmitted packet is in essence given priority over other low priority packets that might have been transmitted ahead of it in the next low priority round. High priority packets are still guaranteed to be delivered before the next frame boundary.

If the reserved payload in the high priority train is such that it has the predetermined maximum duration (frame time−[max low priority packet transmission time+overhead]), then the retransmitted packet will extend for the duration of the high priority train past this limit by an amount equal to the retransmitted packet's transmission time. This will cause following high priority packets to be transmitted later, however, such packets are still guaranteed to be delivered before the next frame boundary because the maximum reserved duration of the high priority train plus the maximum time to transmit a low priority packet will still cause the high priority train to end before the next frame boundary.

In this same case the retransmission also reduces the available duration of the low priority packet train in that frame to almost zero. This causes any packet transmission that is attempted by a ready station in the following low priority train to always experience a T-Collision. This packet will be retransmitted in the high priority train of the following frame. Thus, even in the worst case situation described above, where the network is operating with the maximum reserved payload in the high priority train and where no packets are successfully transmitted in the low priority train, at least one low priority packet will be successfully transmitted in the high priority train of each frame. FIG. 11 provides an illustration of this situation in which the high priority payload increases to the maximum in frame i.

It may be seen that in frame i−1 low priority packet 30 has been corrupted due to a collision 31, and is retransmitted as packet 32 in the high priority train of frame i. The collided packet immediately follows a complete packet in a low priority round, which follows a locomotive.

However, in frame i low priority packet 30A immediately follows a locomotive and is corrupted due to collision 31A. Therefore there was not enough time for even a single low priority packet to be transmitted. In this case, the low priority packet 30A is retransmitted as packet 32A in the following high priority train in frame i+1. Thus at least one low priority packet can be successfully transmitted in each frame.

Of course many situations between these two extreme cases can also exist depending on the duration of the high priority train, the transmission time of low priority packets that experience T-collisions and the duration of the frame. The network adjusts dynamically to accommodate the situation encountered in each frame.

1.2.2 OPTION 2

The second retransmission option illustrated in FIG. 10 (Retransmission Option 2) is to retransmit a T-collided packet at the earliest possible opportunity, but only in a low priority train. Thus, unlike the first option, the time of retransmission is controlled by the state of the station's HPRF flip-flop. Low priority packets are not retransmitted in the next high priority train. Instead they must again contend for transmission in a subsequent low priority train.

Because stations upstream of the station that experienced the T-Collision on the outbound channel may have become ready to transmit in the time since the T-Collision occurred and the start of the next low priority round in the next frame, a packet that has encountered a T-Collision may be transmitted after these packets in the next priority round. Additionally, if another frame boundary occurs before the packet is retransmitted in the following frame its transmission will be delayed until a low priority train in a later frame. The packet may also endure another T-Collision in any cycle in which its retransmission is attempted. Thus, this option allows one or more packets to endure a (potentially infinite) number of T-Collisions resulting in increased delay for low priority packets. Unless a round robin is employed in the low priority packet class as described in the following section, a packet can potentially endure many successive T-Collisions in a heavily loaded network. During this process several packets may have endured T-Collisions and be awaiting retransmission in the network. This is not permissable if packet duplication is to be avoided. For these reasons this option is not recommended.

1.3 FAIRNESS IN THE TRANSMISSION OF LOW PRIORITY PACKETS

Although each station can be assured of a reserved high priority packet transmission in the high priority train in each frame, low priority packets are not ensured transmission in a given frame. From the previous description it will be understood that stations, attempting to transmit low priority packets attached to the network closer to the end station on the outbound channel, have transmission priority over those further from the end station. It is possible that some of these stations may transmit enough packets that some downstream stations may infrequently, or never, gain the access right on the outbound channel, especially in networks with high priority packet payloads at or near the maximum allowed and where the number of low priority packets ready for transmission exceeds the time for their transmission in a frame. In this situation some downstream stations on the outbound channel may infrequently, or never, gain the access right. In order to eliminate this problem a round robin may optionally be used among all of the stations that are attempting to transmit low priority packets.

In a network using the present invention an optional round robin for low priority packet transmission can operate in the following manner.

The station configuration used to achieve this is shown in FIG. 12 (ignoring clock 15). An accompanying timing diagram can be found in FIG. 13. The end station configuration used to achieve this is as shown in FIG. 12 with the master frame clock 15 included and with the activity detector 18 not included.

Elements 15-19 are shown as in FIG. 7. In addition, the end of train detection output of receiver 17 is applied to one input of AND gate 33, which has its output applied to an input of AND gate 34. The output of AND gate 34, a high signal thereon designating that an empty low priority train has been detected, is applied to the set input of LPTF flip-flop 35. The Q output of flip-flop 35 is connected to a low priority signal transmit enable input of transmitter 16. A low priority transmission successful indicator output of transmitter 16 is connected to the clear input of flip-flop 35.

An output of receiver 17 indicating that a start of packet has been detected (SOP) is applied to the set input of flip-flop 36, and an output of receiver 17 indicating that the beginning of a train has been detected (BOT) is applied to the clear input of flip-flop 36. The $\overline{Q}$ output of flip-flop 36, designating a train empty flag (TEF) is applied to the second input of AND gate 34. The BOT lead output of receiver 17 is applied to the set input of flip-flop 37 which has its Q output, designating that a low priority round has started, applied to the second input of AND gate 33. The bus clear signal detected output of receiver 17 is applied to the clear input of flip-flop 37.

The various level states which exist on the various leads identified above are shown in FIG. 13, relative to the data stream as observed by the station's receiver 38. The crosshatch convention designating the various types of signals in parts of the data stream is similar to that shown earlier, e.g. as in FIGS. 10 and 11.

It may be seen that the bus clear lead goes high during the non-collided portion of the bus clear signal. The BOT goes high during the round clear, or locomotive signal. The EOT lead goes high for an interval immediately following the end of a low or high priority data stream. The HPRF lead goes high for the interval of the high priority data stream including the interval of the bus clear signal. The low priority round started signal goes high for the interval starting at the beginning of the first locomotive following the high priority round signal, and ends at the beginning of the uncolided portion of the next bus clear signal. The TEF signal goes high starting with the beginning of each locomotive that starts each low priority round and remains high until the start of a packet is detected. This causes TEF to be high when EOT becomes active if the train was empty and TEF to be low when EOT becomes active if the start of at least one packet was detected in the train. The train empty lead (output of AND gate 34) goes high immediately following each locomotive signal that has no immediately following data attached to the train.

Thus each station that is attempting to transmit low priority packets is provided with a Low Priority Transmission Flag (LPTF). This flag has two states, Active and Dormant.

When a station's LPTF output of flip-flop 35 is in the active state, it's transmitter 16 is allowed to transmit low priority packets (each station may transmit a single packet, multiple packets, or all of the packets in its queue—referred to as exhaustive service, when it receives the AADACP access right, depending on the policy in use in that station for that priority of packet). Whenever it successfully completes such a transmission it sets its LPTF flip-flop 35 output to the dormant state by clearing flip-flop 35. When a station's LPTF flip-flop output is in the dormant state, it's transmitter 16 is not allowed to transmit any low priority packets until its LPTF flip-flop output re-enters the active state.

A station's LPTF flip-flop is reset to the active state whenever its receiver detects the end of a low priority train that contains no low priority packet transmissions. This is referred to as an empty low priority train. This is a simple event to detect since each station's receiver monitors all of the packets in each train on the inbound channel in order to determine which of them to place in its receive queue.

Each station resets its Train Empty Flag (TEF) flip-flop 36 to the empty state when its receiver detects the beginning of a train on the inbound channel (BOT) and then sets the TEF flip-flop to the not empty state if its receiver detects the start of at least one packet transmission thereafter. When a station's receiver detects the end of a train (EOT) the station resets its LPTF flip-flop to the active state if its TEF flip-flop is in the empty state.

When a station is turned on it sets its LPTF flip-flop to the active state. Thereafter, when it completes the successful transmission of a low priority packet it sets its LPTF flip-flop to the dormant state. This causes each ready to transmit station in the network to be allowed a single low priority transmission whereupon it must wait for the arrival of an empty low priority train. This will not occur until all of the stations ready with low priority packets have made a successful transmission and have set their LPTF flip-flop to the dormant state. Thus, detection of an empty low priority train can only occur if all of the stations ready with low priority packets in the network have set their LPTF flip-flops to the dormant state. This ensures that each station has a single chance to transmit since the last empty low priority train was detected.

The empty low priority train is used to start a new round robin among the stations with low priority packets to transmit. The empty low priority train terminates or ends a low priority round robin and starts a new one. It constitutes the condition for ending a round robin (thus starting a new one) and is referred to as the end-of-round condition.

1.4 PACKET DUPLICATION

Since retransmissions occur when the present invention is employed it is possible that packets may be duplicated.

Packet duplication may occur in the following manner. A transmitter may detect that a T-Collision has occurred. However, one or more receivers in the network may receive this original packet transmission intact without detecting a T-Collision. When the transmitter later retransmits the packet it believes to have been destroyed by the T-Collision, these receivers will receive a second, duplicate, copy of the packet.

In some applications packet duplicate may not pose a problem. Such events may be dealt with in higher layer protocols or have no effect on the application systems' operation.

In other applications, packet duplication may not be discovered or dealt with in higher layer protocols and can lead to failure of the application or the introduction of additional overhead to discover them. In such application systems the possibility of packet duplications must be reduced to a very low level.

If duplication is to be eliminated several conditions must be met to ensure that T-Collisions can be detected unambiguously by both transmitters on the outbound channel and by receivers on the inbound channel.

1. Each packet must be preceded by an indicator of some sort that indicates that the transmission of a packet follows the indicator.

2. The end of each packet must be delimited by an indicator of some sort that, when transmitted, indicates that the packet transmission is complete.

3. The bus clear signal must be recognizable even though the first part of it will frequently become corrupted due to a T-Collision. Since receiver synchronization to the packet stream will likely be lost during a T-Collision, the bus clear signal must ensure receiver re-synchronization so that receivers can detect the presence of the bus clear signal itself and receive the packets in the following packet train. The bus clear signal can be implemented by use of either of the two following methods:

(a) A uniquely identifiable burst of unmodulated carrier;

(b) In networks that encode data within packets using block codes, a burst of modulated carrier that contains a repeated uniquely identifiable block code.

1.5 DISTRIBUTING THE MFC TIME BASE

In some slotted hybrid circuit/packet switching networks each station is capable of detecting the beginning of each frame by monitoring the signals transmitted by an end station.

In some unslotted hybrid circuit/packet switching networks this is also possible but, unlike slotted networks, requires that all of the stations in the network should have implicit knowledge of the frame's duration and maintain a local timer to determine which signals transmitted by the end station constitute the frame boundary.

Stations in such networks employ a local phase locked loop that is locked to the signals that indicate a frame boundary to generate a local frame clock that is phase and frequency locked to the frame boundaries generated by the end station. Such clocks are necessary in switching equipment that is used in synchronous networks such as telephony, data and ISDN networks.

Stations in unslotted networks that use the present invention operate in a similar manner to those in slotted networks, consequently not requiring implicit knowledge of the frame's duration nor the maintenance a local timer to determine which signals transmitted by the end station constitute the frame boundary. This is achieved in the following manner.

In networks that employ the present invention the detection of the bus clear signal by a station's receiver 17 indicates the beginning of each frame. Each station may optionally phase lock to this event using a phase locked loop 39 to generate a local frame clock as shown in FIG. 12. This local frame clock may be used as a synchronous time base by one or more network transmission facilities connected to the station or for other purposes.

Due to T-Collisions between the bus clear signal and packets being transmitted on the outbound channel, the detection of this event by receivers may or may not be delayed by the maximum duration of a T-Collision. This is the time that it takes for the activity detector to detect the presence of the bus clear signal and for the transmitter to stop transmitting. This causes a slight jitter in the signal which indicates that a bus clear signal has been detected. The station uses this indicator signal as a phase lock source. However, in practical networks the duration of the jitter is usually a fractional percentage of the frame time and within the tolerance allowed. In many cases the jitter is less than the resolution of the phase locked loops employed. Jitter in the phase locked loop can also be reduced by introducing a suitably long time constant to reduce the maximum rate of phase adjustment thus averaging the jitter over long periods of time.

This problem can be avoided but at certain cost. If, instead of ending the transmission of the bus clear signal when its receiver detects the bus clear at its R tap, the end station may instead transmit the bus clear signal for a fixed duration. This duration must be longer than the propagation delay between the end station's T and R taps on the UBS plus the worst case time for a station to detect the bus signal in the presence of a T-Collision. In the previous method the signal created by the detection of the end of the bus clear signal jittered in the same manner as that created by the detection of the beginning of the bus clear signal. Using this method the end of the bus clear signal will always occur at a fixed point in time following the frame boundary even in the presence of T-Collisions. Thus stations can obtain a timing source that does not jitter by phase locking to the disappearance of the bus clear signal rather than to its appearance. Stations can optionally correct for phase difference between the frame boundary and end of the bus clear signal by measuring the maximum length of the bus clear signal and using this value as a phase correction.

However, using this method either the network propagation delay must be determined by the end station, or a worst case value for the propagation delay must be used. If the end station is to determine the network propagation delay some complexity is introduced in the end station, while the latter alternative has an adverse impact on the network's performance since the value used is always longer than the actual propagation delay. For these reasons this alternative is not preferred.

The above method guarantees that any packets that are successfully transmitted in a frame will always be received by any station in the network before that station's local frame clock indicates the end of the current frame. This can easily be seen to be true since the arrival of the bus clear signal at a station's receiver determines the end of the current frame for each station and any successful transmission will be received by a station prior to this event occurring. This is not the case for prior art methods since packets successfully transmitted in the last 2t (2t=propagation delay from end station's T to R tap) of the frame will arrive after the current frame boundary. This problem is, however, easily prevented for high priority packets by controlling the reserved payload in the high priority train to prevent transmissons of high priority packets at this point in the frame.

It should be noted that all stations in the network recover the MFC with a phase delay that corresponds to their positions on the inbound channel. The maximum delay between frame boundaries according to the recovered clocks of stations corresponds to the delay along the inbound channel between the two stations attached to each end of it. This is essentially time interval t. Thus station M's clock will occur about t seconds in advance of station 2's clock (FIG. 1). If t<the frame duration as is the case for most practical system area networks then this phase difference is a small percentage of the frame time t being the propagation delay along the inbound or outbound channels. In any case, these phase differences are usually of no consequence in a synchronous network environment provided that they remain constant (when they change frame slips will occur—although permissible at a low rate it is desirable to maintain such changes and the resulting frame slips to as low a rate as possible).

1.6 PHASE LOCKING THE MFC TO A STATION CLOCK SOURCE

In many switching systems used in the networks described in section 1.5 it is desirable to phase and frequency lock the MFC in the end station, and thus all of the stations in the network that are locked to it, to a frame clock provided from an external source such as a communications facility that is attached to a station in the network.

This can be optionally achieved in networks that use the present invention in the following manner. Each station with an external frame clock source determines the phase difference between the external frame clock source and that of the end station's (from the detection of the arrival of a bus clear signal) by use of a phase comparator. The station encapsulates the phase difference measured by the phase comparator in a timing packet that is transmitted in the next high priority train. This may be performed in each frame or the phase difference may be averaged over n frames and the timing packet broadcast once every n frames. Portions of a station configuration used to achieve this is shown in FIG. 14.

An external timing source signal is applied to a frame recovery circuit 40, which recovers the clock and applies the clock signal to a phase comparator 41. The bus clear signal detected output of receiver 17 is also applied to phase comparator 41. The phase comparator generates timing packets encoded with the phase difference between the beginning of the uncorrupted portion of the bus clear signal and the external timing source and applies those timing packets to transmitter 16 for transmission along the outbound channel, upstream portion 11 of the bus.

FIG. 15 illustrates receiver 17 having an output for providing detected timing packets to end station master frame clock 15. The master frame clock 15 constantly adjusts its phase to maintain a zero phase difference in the timing packets detected by receiver 17. The master frame clock 15 applies bus clear signal enable signals to transmitter 16, establishing frame boundaries such that the phase difference, as measured by the station with the external frame clock source, between the bus clear signals detected by its receiver and its external frame clock source, is minimized. This causes the phase of the bus clear signal, as detected by this station, to align with its external frame clock source.

The end station receives a constant sequence of these timing packets and uses them to adjust the phase of its MFC to maintain a zero phase difference between its MFC and the external frame clock source as measured by the station with the external source. Several stations with such sources may be broadcasting timing packets on the network at the same time and the end station may be directed to phase lock to the timing packets transmitted by any one of these stations. The maximum rate of phase adjustment of the MFC in the end station can be limited to minimize abrupt phase changes that might occur should the end station be directed to phase lock to a different station's clock source.

The timing packets are transmitted from the station containing the external timing source in high priority rounds. As described in section 1.5, fixed length bus clear signals may be employed and the stations may lock to the end of the bus clear signal.

1.7 IMPOSING A SUPERFRAME STRUCTURE

The sequence of frames provided by the bus clearing method invention, may be optionally organized into superframes each containing n frames. Stations can use the superframe structure to transmit high and low priority packets only in predetermined frames of the superframe.

This allows many stations in the network to transmit high priority packets of a fixed length once every n frames. Using a superframe structure, n stations can share 1/n of a bandwidth allocation in each superframe by having each of n stations transmit in a different frame within the superframe.

In general, a high level control protocol can be used to allocate reservations for transmission time in the high bandwidth train in each frame of the superframe to stations in any manner desired.

In networks that use the bus clearing method invention, superframes are optionally established by the end station and are used by the network stations in the following manner. In the high priority train of each frame the end station broadcasts the frame number of the frame that will follow the current one in a superframe packet. Each station keeps a table of the frame numbers in which it is allowed to transmit as determined by the high level control protocol. When the frame number contained in the superframe packet is in a station's table it allows itself to transmit a high priority packet in the next frame. The resulting signal structure is shown in FIG. 16.

It may be seen that a superframe packet which contains an encoded frame number is transmitted from the end station immediately following each bus clear signal. Since there are a sequence of frames from frame 1 to frame n within each superframe, clearly each superframe packet within a superframe does not repeat, and begins again from an initial value in each superframe. Therefore each of the stations that is to transmit once per superframe, having stored the frame number in which it is to transmit, only detects that frame number once per superframe. It will therefore transmit only once per superframe, rather than once per frame.

This method allows the end station great flexibility in assigning the sequence of frame numbers and the number of frames in each superframe. Alternatively, the end station may broadcast a superframe packet in only one frame of the superframe to identify the superframe boundary. In this case all of the stations must know the number and sequence of frames in the superframe rather than just the end station.

It should be noted that although high priority packets may have variable length, it is assumed that the packets transmitted by any single station are of fixed length, or alternatively that the station has reserved space for a packet with a fixed maximum length and may transmit variable length packets no larger than this reserved size.

2.0 MULTIPLE LOW PRIORITY CLASSES

In this slightly more complex mode of operation the network transmits data packets in multiple priority classes that consist of a single class for high priority packets and multiple classes for low priority packets. Each station maintains a separate transmit queue for packets within each priority class. Each station may maintain separate receive queues for packets within each priority class (preferred) or a single queue for all received packets.

The basic mode of operation described in section 1.0 can be enhanced to include multiple low priority classes of packets in the following manner.

The HPRF flip-flop described in section 1.0. is replaced by a Train Counter (TC) 45 as shown in FIG. 17. This counter counts data trains detected by receiver 17 from 0 to n, where n is the number of low priority classes required. When the TC contains a count of n and is again incremented, it overflows and restarts with a count of 1.

Upon the detection of the bus clear signal (starting a new cycle at a frame boundary), the counter 45 is reset to contain a count of 0. Each time a station's receiver detects the end-of-train (EOT) event on the inbound channel the train counter 45 is incremented.

Consequently, the TC will contain 0 when the first train that follows a bus clear signal in a frame is in progress. The counter will be incremented to contain a count of 1 when the end of this train is detected. As each following train ends the counter will be incremented until it is eventually reset by the detection of a bus clear signal. The counter will recycle to a count of 1 every n trains after the first train in a frame.

Each packet is assigned a transmission priority from 0 to n. Packets in the high priority class are assigned a priority of 0. The highest priority packets in the low priority class are assigned a priority of 1, and packets with decreasing priority in this class are assigned with increasing priority numbers until the lowest priority packets in the low priority class are assigned with a priority of n.

A station's transmitter transmits packets having priority i in a priority i train. A priority i train is one in progress when the TC contains a count of i.

Thus, only high priority packets are transmitted in the first train in each frame, followed by the highest priority packets in the low priority class in the next train and so on until the lowest low priority packets in the low priority class are transmitted in train n of the frame. This is shown in the signal structure in FIG. 18. The end station configuration used to achieve this is similar to that of FIG. 17.

Each train constitutes a priority round in which all stations with priority i packets ready to transmit are given a chance to transmit them.

Should more than n trains occur in a frame, the sequence of priorities assigned to each train after train n in the sequence will constantly repeat in a cycle from 1 to n. A sequence of trains in which each low priority class is given an opportunity to transmit is referred to as a low priority cycle. Two low priority cycles within a frame are shown in FIG. 19, the first starting after locomotive 48 and the second starting after locomotive 49.

Clearly, the start of the new frame may cause the transmission of a bus clear signal during any of the trains after the first (high priority) train in a frame, thus terminating the sequence of low priority trains. If this occurs before the completion of a low priority cycle, then the opportunity to transmit some low priority class packets will be eliminated. This occurs if the transmission time of the low priority packets ready for transmission in a frame exceeds the time available for their transmission in a frame. When this occurs (the offered load exceeds frame capacity) the above-described method transmits packets in order of their assigned priority, thus giving transmission priority to those having the highest priority.

As described in section 1.3 an optional round robin may be introduced to ensure that use of the network's capacity to transmit low priority class packets is effected in a fair manner that is independent of a station's position with the network. A round robin must be introduced per low priority class if fair use of each such class is required.

In a network such as that just described above an optional round robin per priority class operates in the following manner.

The station configuration used to achieve this is shown in FIG. 20, without the master frame clock 15. An accompanying timing diagram can be found in FIG. 21. The end station configuration used to achieve this is shown in FIG. 20, with the frame clock 15 included.

The structure of FIG. 20 is similar to that of FIG. 12, except for the deletion of the flip-flop 19 and of flip-flop 35. In place of flip-flop 19 is a counter 50, having its count input connected via an inverter 51 to the end of train detected output of receiver 17.

The output of AND gate 34 is connected to the set input of an addressable multiple R/S flip-flop 52 LPTF(i). The count output Q0–QX of counter 50, designating the priority level of the current train detected by receiver 17, is connected to transmitter 16 and to the address inputs A0–AX of multiple R/S flip-flop 52. The low priority transmission successful confirmation output lead is connected to the clear input CLR of multiple R/S flip-flop 52.

With reference to FIG. 21, the bus clear BOT and EOT signals have been described earlier, and are similar to the corresponding signals in FIG. 13. The train counter 50 output QO-QX provides a train count signal having boundaries immediately following the EOT signals. The low priority round started, TEF and train empty signals are similar to those described with reference to FIG. 13.

Each station that is attempting to transmit low priority packets is provided with a separate Low Priority Transmit Flag for each low priority packet class, LPTF(i) where $1<i<n$. Each LPTF(i) 52 (addressable multiple R/S flip-flop) has two states, Active and Dormant.

When the station's LPTF(i) flip-flop output (referred to as LPTF(i), below) is in the active state, it's transmitter is allowed to transmit priority i packets in priority i trains (each station may transmit a single packet, multiple packets, or all of the packets in its queue—referred to as exhaustive service, when it receives the AADACP access right, depending on the policy in use in that station for that priority of packet). Whenever it successfully completes such a transmission it sets its LPTF(i) to the dormant state.

When a station's LPTF(i) is in the dormant state, it's transmitter is not allowed to transmit any priority i packets until its LPTF(i) re-enters the active state. A station's LPTF(i) is reset to the active state whenever its receiver detects an empty priority i train. This is a simple event to detect since each station knows the number of each train and each station's receiver monitors all of the packets in each train on the inbound channel in order to determine which of them to place in its receive queue.

The receiver of each station detects empty trains as described in section 1.3.

When a station is turned on it sets all of its LPTF(i) to the active state. Thereafter, when it completes the successful transmission of a priority i packet it sets its LPTF(i) to the dormant state. This causes each station ready with priority i packets in the network to be allowed a single low priority transmission whereupon it must wait until an empty priority i train is detected. This will not occur until all of the stations ready with priority i packets have made a transmission and have set their LPTF(i) to the dormant state. Thus, detection of an empty priority i train can only occur if all of the stations ready with priority i packets in the network have set their LPTF(i) to the dormant state. This ensures that each station has a single chance to transmit priority i packet(s) since the last empty priority i train was detected.

The empty priority i train is used to start a new round robin among the stations with priority i packets to transmit. The empty priority i train terminates or ends a priority i round robin and starts a new one. It constitutes the condition for ending a round robin and is referred to as the end-of-round condition.

A slight improvement can be achieved and some empty trains eliminated if a station optionally uses the detection of the start of a priority i+1 train in addition to the detection of an empty priority i train as the end-of-round condition. Using this method a station sets its LPTF(i) to the active state if it detects either an empty priority i train or the start of a priority i+1 train in a cycle. This simply adds a further condition to the one previously described that can be used to end a round that eliminates some empty priority i rounds. This additional condition can be seen to also define the end of a priority i round in the following manner. If a priority i+1 train is observed to start, then the previous priority i trains must have terminated before the end of the current frame. Since this could not occur unless all of the stations having priority i packets ready to transmit have had an opportunity to transmit them in the priority i train, there can be no such ready stations whose LPTF(i) is in the active state. This is the end-of-round condition for the priority i round robin. Thus, LPTF(i) of each station may be set to the active state to restart the round for that priority class.

Using this method, packets having priority i may never be transmitted if sufficient traffic exists in higher priority classes $j<i$ such that the frame boundary always occurs, terminating the cycle, before train i is started.

This can be rectified if a station uses the detection of the start of a packet in a priority i+1 train as the end-of-round condition. Using this method a station sets its LPTF(i) to active only when it observes the start of a packet in a priority i+1 train (since n is the lowest priority class, LPTF(n) is still set to active when an empty priority n train is detected). This ensures that packets in each priority class will eventually be transmitted, even in a heavily loaded network.

This method can be seen to operate in the following manner. Each time the round robin for a priority class terminates, the next lower priority class is always allowed to transmit one or more packets before the higher priority class's round robin is restarted. Thus one or more second priority packets will be given an opportunity to be transmitted each time the round robin for first priority packets terminates. This will allow a round of second priority packets to eventually terminate. When this occurs one or more third priority packets are given an opportunity to be transmitted, thus allowing a round of third priority packets to terminate. This process repeats itself for lower and lower priority levels, eventually allowing packets within each priority to be transmitted at lower and lower rates. This is illustrated in the chart in FIG. 22 for multiple round robins within each priority in 31 sequential frames for five low priority classes (where S indicates a priority round that is terminated by a bus clear signal and E indicates an end to the round robin for that priority class).

Stronger preference for lower priority cycles can be achieved if a station uses the detection of an empty priority i+1 train as the end-of-round condition and sets its LPTF(i) to active only when it observes an empty priority i+1 train or, optionally, the start of a priority i+2 train (since n is the lowest priority class LPTF(n) may still be set to active when an empty priority n train is detected).

Other similar combinations of end-of-round conditions can be used in a similar manner.

3.0 TERMINATING THE HIGH PRIORITY ROUND WITH A ROUND CLEAR SIGNAL

In the two previously described methods and means for dual and multiple priority networks the duration of the high priority train was controlled by a high level control protocol. Stations use this protocol to make reservations for transmission time in the high priority train.

In some networks this may not be desirable or possible. An example of a network where this is not desirable is one in which the high priority train consists of packets containing talkspurt speech information. Such networks rely on the statistical advantage of transmitting speech information only when speakers are talking. This provides several times the capacity of networks where a fixed bandwidth is assigned to each speaker. In such networks the duration of the high priority train can be limited to a maximum value by the use of a round clear signal in the same manner that a bus clear signal is used to terminate a frame. When this occurs some talkspurt speech packets will be discarded. However, the loss of such packets does not substantially degrade the quality of the speech recovered because this occurs only occasionally.

Now will be described method and means in addition to those described above in which a signal similar to but differentiable from the bus clearing signal, a round clear signal, is used to optionally terminate the high priority round at a predetermined point within each frame. This method and means may be used in either dual or multiple priority networks as described in the previous two sections.

The MFC of the end station produces an additional signal that indicates the maximum amount of time from the beginning of each frame that is allocated for the use of the high priority train. This signal can be called the End Of Round signal (EOR(0)). In essence the EOR(0) divides the frame into two parts. The first part extends from the beginning of the frame until the EOR(0) is produced. The second part extends from when the EOR(0) is produced until the end of the frame. The EOR(0) is used to ensure that the first part of the frame may be used by both high and low priority trains, while the second part may be used only by low priority trains. This is illustrated in FIG. 23.

When the MFC produces the EOR(0) signal the end station determines if the high priority train has terminated by examining the state of its HPRF flip-flop in a two priority network, or its train counter TC in a multiple priority network. Depending on the state of the HPRF/TC when the EOR(0) occurs the end station will act in the following manner.

If the HPRF/TC (flip-flop/counter) indicates that the high priority round has ended, then the end station behaves as in the previously described methods. The end station generates a new locomotive each time it detects EOT unless it is transmitting a bus clear signal.

If the HPRF/TC indicates that the high priority round has not ended, then the end station behaves in the following manner. The end station begins the transmission of a round clear signal. This signal is similar to, but can be detected separately from, the bus clear signal by the station receivers. The round clear signal functions in the same manner as a bus clear signal, propagating along the outbound channel and causing either situation 1 (following or appended to the end of the high priority train) or situation 2 (causing a T-collision with the end of the high priority train) as described in section 1.0.

Thus a round clear signal can be the locomotive which appears after an end of train, or can collide with a high priority round, terminating it.

Stations that experience a T-Collision while attempting to transmit a high priority packet do not attempt to retransmit the packet and it is discarded. Such packets are discarded since they cannot be transmitted before the next frame boundary and have no value if transmitted later. Such packets are referred to as stale packets. Stations that are downstream of a station that detects such a T-Collision will not receive the access right to transmit in this frame's high priority round. Thus, any high priority packets scheduled for transmission in this frame in these stations cannot be transmitted before the next frame boundary. Since these stale packets have no value if delivered in a later frame, they will be discarded when these stations detect the end of the current high priority round.

Eventually the round clear signal and any T-Collision that it has caused propagates onto the inbound channel and is detected by the station receivers. This is the Round Clear detection event (RC). When this occurs receivers on the inbound channel will detect one of two situations.

An EOT caused by the end of the high priority train will be detected followed by an RC that is coincident with the detection of the beginning of a train (BOT) (a T-Collision is never detected in this case) This occurs when a sufficiently long idle period occurs between the end of the high priority train and the round clear signal.

An RC that is not coincident with a BOT is detected, and an EOT is not detected (a T-Collision may or may not be detected in this case). This occurs when a sufficiently long idle period does not occur between the end of the high priority train and the round clear signal or when a T-Collision occurs.

In either situation each station behaves as follows. Each station discards any packets that have been corrupted due to a T-Collision. When a station receiver 17 detects an RC that is not co-incident with a BOT the station receiver 17 behaves as if it has detected an EOT. If a round robin (or round robins in the case of a multiple priority network) is in use, each station will behave as if it detected a BOT when it detects an RC.

Thus, in either situation 1 or 2 above each station receiver 17 behaves as if it detected an EOT followed by a BOT. This causes the station's HPRF flip-flop to be set in a two priority network, or the train counter TC to be incremented in a multiple priority network. This HPRF/TC state change indicates the end of the high priority round and the start of the low priority round in each station. It is at this point that stations discard "stale" high priority packets. If a round robin is in use the BOT resets the TEF (to the empty state) in order to determine if the next train is empty.

It should be noted that this method causes the stations to behave in the same manner as if a round clear was not used and the high priority train had ended before EOR(0).

The station configuration to achieve the procedures described in this section is the same as that in FIG. 7 for two priority networks without a round robin( FIG. 12 (without the master frame clock) for two priority networks with a round robin, FIG. 17 for multiple priority networks without a round robin, and FIG. 20 for multiple priority networks with a round robin, if the receiver uses the following rules to issue the BOT and EOT signals.

1. It issues the EOT signal when it detects either the end of a packet train or the arrival of a round clear signal that is not detected to be the beginning of a packet train.

2. It issues the BOT signal when it detects either the beginning of a packet train or the arrival of a round clear signal.

3. In the case where the above two events occur at the same time, the receiver issues the EOT signal before the BOT signal (this is only necessary if a round robin is in use as it provides an opportunity for the LPTF flip-flop of that priority class to be set if an empty train was detected).

Eventually the end station's receiver will detect either situation 1 or 2 described above at its R tap. The end station behaves in the same manner as the other stations. In addition the end station starts the next packet train using the following method and structure.

The end station structure to start the next train is shown in FIG. 24 for a two priority network without a round robin, and in FIG. 25 for a multiple priority network without a round robin. The end station configuration for a two priority network with a round robin is obtained by adding the round robin logic structure in FIG. 12 to the logic structure in FIG. 24. Similarly the end station configuration for a multiple priority network with a round robin is obtained by adding the round robin logic in FIG. 20 the logic in FIG. 25.

In FIG. 24, the HPRF flip-flop 19 is connected to the bus clear signal detected lead output of receiver 17, and the end of train detected lead of receiver 17 is connected to the clear input of flip-flop 19. The Q output, HPRF, is connected to transmitter 16 as described earlier.

The master frame clock 15 is connected to transmitter 16 as described earlier.

The HPRF lead is connected to one input of AND gate 53, which indicates that a high priority round is completed. An end of round EOR (0) signal from master frame clock 15 is applied to the second input of AND gate 53. The output of AND gate 53 is connected to transmitter 16 for enabling transmitter 16 to start sending a round clear signal.

FIG. 25 illustrates receiver 17 and transmitter 16, with the master frame clock and AND gate 53 connected in a similar manner as described for FIG. 24, except that the high priority round complete input of AND gate 53 is derived as follows.

Counter 50, described earlier with respect to FIG. 20, has its clear input connected to the bus clear signal detected output of receiver 17 and its count input connected to the output of inverter 51. The Q0–QX count outputs of counter 50 are connected to the input of transmitter 16 as described earlier, and also are connected to the A0–AX address leads of comparator 54. The B0–BX inputs of comparator 54 are set to a binary value of "1". The A=B output of the comparator 54 becomes active when the binary value presented at its A0–AX inputs is greater than or equal to the binary value presented at its B0–BX inputs. The output of comparator 54 is connected to one input of OR gate 55, and the overflow (OVFL) output of counter 50 is connected to the second input of OR gate 55. The output of OR gate 55, designating that the high priority round is complete, is connected to the corresponding input of AND gate 53 described for the same purpose with respect to FIG. 24. A round clear signal detected output of receiver 17 is connected to a "stop sending round clear" signal input of transmitter 16, for the named function.

When the end station detects a round clear signal (RC) it stops transmitting the round clear signal. In a two priority network it then appends to the end of the round clear signal any low priority packets in its queue. In a multiple priority network it appends any priority 1 packets in its queue since its TC contains a count of 1. This initiates the first low priority train causing the low priority round to start in the same manner as that used by a bus clear signal to start a high priority train. Thus, the end station starts a new packet train when it detects an EOT, RC, or BC.

Thereafter, the network behaves as in the previous descriptions of single and multiple priority operation for a low priority/priority 1 train until the frame is terminated by a bus clear signal.

Thus, if the data payload in the high priority packet train uses less than the maximum portion of the frame that it is allowed as determined by the MFC's EOR(0) signal, the high priority round ends as in the previous descriptions of single and multiple priority networks. If the high priority round does not terminate before this time expires, the end station forces its termination by the use of a round clear signal.

FIG. 26 illustrates the operation of a two priority network in which the round clear is employed. FIGS. 27 and 28 illustrate the operation of a multiple priority network in which the round clear is employed.

It may be seen from FIG. 26 that a round clear signal collides with a packet in the high priority round, beginning low priority round 1. Following an idle interval a locomotive is generated by the end station, which initiates low priority round 2.

In FIG. 27 a round clear signal is shown colliding with a high priority packet, beginning a first priority round of low priority signals. Following the end of the round there is an end of train condition and brief idle period following which a locomotive is generated, which initiates the second priority round of low priority signals to be applied to the bus from the plural stations. Following another end of train detection in the end station there is a brief idle bus period following which a locomotive is generated at the end station, beginning the next priority round packet train to be generated from the plural stations. This continues with successively changing priority rounds, until another bus clear signal is generated in the end station, colliding with a low priority packet, initiating another high priority round signal.

FIG. 28 is similar to FIG. 27, except that rather than successively decreasing priority packet trains being generated, several cycles of successively decreasing priority trains are generated (shown as two cycles in this figure) before a bus clear signal collides with a low priority packet, initiating another high priority round.

4.0 TERMINATING MULTIPLE PRIORITY ROUNDS WITH A ROUND CLEAR SIGNAL

The method and means for bus round clears described in the previous section may be more generally applied to multiple priority networks to optionally terminate any or all of the priority rounds in a frame. This section describes method and means in addition to those described in the previous section in which a round clear signal is optionally employed to terminate any or all of the priority rounds at predetermined points within each frame.

In this enhanced mode of operation the MFC 15 shown in FIG. 25 provides additional outputs I0–IX, that are connected to the B0–BX inputs of comparator 54, as shown in FIG. 31. A binary number, i, coded in these outputs by MFC 15 provides the number of the next priority round that the EOR output will attempt to terminate. The value of I0–IX changes to the next value each time the EOR(i) signal becomes inactive.

The MFC of the end station generates a sequence of signals EOR(i), $0 < i < n-1$ such that EOR(i) indicates the maximum time that may be allocated for the transmission of all packets in priority classes k<i within each frame, instead of the single EOR(0) signal in FIG. 25. This divides the frame into n parts guaranteeing each priority class a minimum fixed allocation in each frame according to the time intervals at which the EOR(i) occur in the end station.

In addition the TC sets a train Counter Overflow Indicator (TCOI) 50 whenever it recycles from count n to count 1. The TCOI is reset when the TC is reset by a BC.

When the MFC produces the EOR(i) signal the end station determines if the first priority i train has terminated by examining the state of its TC/TCOI.

If the TC contains a count greater than i or the TCOI is set, then the end station behaves as in the previous description of single and multiple priority networks.

If the TC does not contain a count greater than i and the TCOI is not set then the end station performs the following actions.

The end station begins the transmission of a round clear signal as described in the previous section. This forces the priority i train to end (if it hasn't already). Stations operate in an identical manner to that described for a multiple priority network in the previous section with the following differences.

1. A round clear may occur when the TC has any value i<n−1.

2. When the end station stops transmitting the round clear signal, it appends any priority i packets in its queue to the end of its round clear transmission where i is the value of its TC. (It should be noted that the TC is incremented by the EOT/RC before this transmission begins so the value of the TC reflects the priority of the new round).

FIG. 29 illustrates the operation of such a network in which round clears are employed to terminate each priority class of a multiple priority network, while FIG. 30 illustrates similar operation in which round clears are employed to terminate only some priority classes.

In FIG. 29 it may be seen that round clear signals are generated in the end station at the various times EOR(1-)−EOR(n−1) and collide with a packet a predetermined time intervals following the beginning of the frame cycle, thus terminating each given priority round (if it has not been terminated by a short train causing an end of train to be detected). The end of round signal thus both terminates the preceding priority round and initiates the succeeding priority round.

FIG. 30 illustrates the above, in which only some rounds are terminated by round clear signals, since end of trains for particular priority rounds where detected and locomotives where generated to start the next round. Since the next round was generated by a locomotive, a round clear signal was not generated. The only time that a round clear signal would be generated for this case is if a particular round length is so long that it extends to the end of round timing This would cause a round clear signal to be generated which collides with a packet on the bus, terminating transmission and beginning a new priority round.

The station configuration used to achieve this, either with or without the use of a round robin, is the same as that described above with respect to FIG. 20. The end station configuration to achieve this without a round robin is as shown in FIG. 31, with the EOR signal from the master frame clock 15 being EOR(i) instead of EOR(0) and the IO-IX outputs of MFC 15 providing the value of i. The end station configuration with a round robin is obtained by adding the round robin logic structure in FIG. 20 to the logic structure just described.

The invention may be used in other different network embodiments, such as listed below.

1. A hybrid circuit/packet switching network with two priority classes of packets, a high priority class and a low priority class in which a high level control protocol must be used to restrain the packet payload in the high priority class to ensure the transmission of low priority packets.

2. A hybrid circuit/packet switching network with multiple priority classes of packets, a single high priority class and multiple low priority classes in which a high level control protocol must be used to restrain the packet payload in the high priority class to ensure the transmission of low priority packets.

3. A hybrid circuit/packet switching network with two priority classes of packets, a high priority class and a low priority class in which the end station uses round clears to restrain the packet payload in the high priority class to ensure the transmission of low priority packets.

4. A hybrid circuit/packet switching network with multiple priority classes of packets, a single high priority class and multiple low priority classes in which the end station uses round clears to restrain the packet payload in the high priority class to ensure the transmission of low priority packets.

5. A hybrid circuit/packet switching network with multiple priority classes of packets, a single high priority class and multiple low priority classes in which the end station uses round clears to restrain the packet payload in any priority class to ensure the transmission of packets in low priority classes.

In addition, any of these network embodiments may use any combination of the following optional capabilities of the invention.

1. A round robin among stations attempting to transmit packets in each low priority class may be introduced.

2. Each station in the network may optionally recover a local copy of the master frame clock in the end station.

3. The end station may optionally phase lock its master frame clock to a clock source in any other station, provided the other station produces timing packets.

4. The end station may optionally impose a superframe structure on the frame sequence.

Methods used with AADACP may be used with the above, such as techniques for preventing collision ambiguity, and various types of coding, start-stop block mode access protocol, etc.

For example, a start of packet train block code SOPT can be used as a locomotive by the end station. The end station transmits some number, n, of SOPT bursts as a locomotive, where n must be greater than 1. The preferred embodiment uses n=4.

SOPT can be used as a bus clear signal by the end station. The end station transmits a minimum number of SOPT bursts in a bus clear signal, m, where m=2n.

This method has several advantages.

1. If a T-Collision is caused it will always be created by a SOPT burst. This burst can be designed to be destructible and receivers will always resynchronize on the next burst.

2. Receivers can distinguish between locomotives and bus clear signals by simply counting the number, k, of sequential SOPT bursts detected. If k>n then the receiver recognizes a bus clear signal and if k<n the receiver recognizes a locomotive.

3. No special means is required in the transmitter of any station to generate a bus clear signal, other than that required to transmit a locomotive.

4. No special means is required in the receiver of any station to detect a bus clear signal, other than a simple 3 bit counter in the preferred embodiment where n=4.

It should be noted that round clear signals can also be created in a network using the above implementation. This is achieved by creating a round clear as follows. The end station transmits a locomotive as described above (e.g. 4 SOPT bursts) followed by a number of control bursts with a unique block code that is coded differently than SOPT, start of packet SOP and end of packet EOP. This burst is called the Start of New Round (SNR) burst. A minimum number of SNRs must be transmitted to guarantee that all of the stations in the network will recognize them. The preferred implementations cause the end station to transmit at least 8 SNRs and have receivers recognize them after detecting a sequence of more than 4.

Although the start of this signal may cause a T-Collision, the collision will be caused by a SOPT which will not be recognized as a bus clear signal since receivers will detect no more than 4 of them in sequence. The SOPT is designed to allow a collision such that the receivers will resynchronize and detect the SOPT following the first if it endures a T-Collision. Thus, if a T-Collision occurs due to the round clear the receivers will be in synchronization before the first SNR arrives. Thus all of the SNR's will be detected and the round clear signal recognized.

Bus Clears can also be implemented in the same manner by defining a unique control burst for this purpose (called Start of New Frame (SNF)) and using it in the same manner as SNR. This eliminates the need to count SOPT's in order to differentiate between a locomotive and a bus clear signal. Of course a minimum threshold (i.e. 4 or 5 sequentially) of SNR or SNF is still required to detect a bus clear or round clear signal (the minimum number is used to ensure that corrupted signals are not mistaken as bus clear or round clear signals).

A person understanding this invention may now conceive of alternative variations based on the principles described herein. All are considered to be within the sphere and scope of this invention as defined in the claims appended hereto.

I claim:

1. A data communication system comprising:
 (a) a unidirectional bus for carrying data signals, having an upstream portion and a downstream portion,
 (b) an end station connected to the upstream portion of the bus,
 (c) other stations connected to the bus downstream of the end station on the upstream portion of the bus,
 (d) means at each of said other stations for appending data signals it may have to transmit to the end of a train of data signals passing thereby downstream on the upstream portion of the bus.
 (e) means at the end station for transferring a bus clear signal along the bus disregarding whether or not there are data signals carried by the bus,
 (f) means at each of said other stations for detecting data signals from upstream on the upstream portion of the bus or the bus clear signal and in the case of said detection for immediately terminating transmission of data signals it may be transmitting on the upstream portion of the bus, and
 (g) means at each of said other stations for appending data signals of predefined priority to the end of a train of signals immediately following the bus clear signal or to the end of the bus clear signal in the event it detects no train of signals immediately following the bus clear signal.

2. A system as defined in claim 1 in which the predefined priority data signals are the highest priority of at least two priority categories of signals it may be enabled to transmit.

3. A system as defined in claim 1 in which the bus clear signal is in a form defining the priority of said predefined priority data signals to be transmitted by said other stations, said other stations including means for detecting the nature of the bus clear signal and thereby initiating transmission of said predefined priority data signals.

4. A system as defined in claim 3 including means in the end station for generating round clearing signals at predetermined times and applying said round clearing signals to the upstream portion of the bus, and means at said other stations for appending data signals having a different priority than said predefined priority to the end of a train of data signals immediately following each round clearing signal or to the end of each round clearing signal in the event it detects no train of data signals immediately following each round clearing signal.

5. A system as defined in claim 4 including means at the end station for transmitting the bus clear signal at first predetermined intervals, thereby defining frames.

6. A system as defined in claim 5 including means at the end station for transmitting the round clearing signals at second predetermined intervals, each interval defining a round, in which each of said second predetermined intervals are much shorter than each of said first predetermined intervals.

7. A system as defined in claim 6 further including means in at least one of said other stations for transmitting timing packets at regular intervals over a period of time following transmission of the bus clear signal and prior to transmission of a first round clearing signal following the bus clear signal.

8. A system as defined in claim 4 in which said different priority data signals all have equal priority which is lower than that of said predefined priority signals, including means at said other stations for transmitting said different priority signals with equal priority following the round clearing signals.

9. A system as defined in claim 4 in which said different priority data signals have multiple priorities which are all lower than the priority of said predefined priority signals, and means in each of said other stations for transmitting said other priority signals in order of decreasing priority respectively following successive round clearing signals, equal priority signals being grouped to follow corresponding round clearing signals.

10. A system as defined in claim 4 in which one or both of the bus clear signals and round clearing signals are synchronous, and means at each of said other stations for phase locking to said synchronous signals.

11. A system as defined in claim 5 further including means in the end station for transmitting a superframe defining packet immediately following a bus clear signal, thereby defining the beginning of a superframe.

12. A system as defined in claim 6 further including means in at least one of said other stations for transmitting timing packets following transmission of the bus clear signal.

13. A system as defined in claim 1 in which each of the stations is connected to the downstream portion of the bus for receiving data signals destined therefor, the end station being connected most downstream thereof to the downstream portion of the bus, and means in the end station for detecting on said downstream portion the bus clear signal transmitted by the end station, and upon detection thereof, terminating transmission of said bus clear signal.

14. A system as defined in claim 1 in which each of said other stations is connected to the downstream portion of the bus for receiving data signals destined therefor, and means for transmitting said bus clear signal for a predetermined interval which is at least as long as a signal transit time along the bus from a connection position of the end station on the upstream portion of the bus to a connection position of the most downstream station on the downstream portion of the bus.

15. A system as defined in claim 14 including timing means in one of said stations, means in said one station for generating a frame timing signal, means in said one station for comparing the timing of the frame timing signal with the timing of the bus clear signal and for generating packets in which the phase difference thereof is encoded and for transmitting said packets to said end station, and means in the end station for adjusting the phase of the bus clear signal to maintain a zero phase difference at said one station between the bus clear signal and the frame timing signal.

16. A system as defined in claim 1, including means at each of said other stations for retransmitting packets of data signals which were truncated due to said termination of transmission.

17. A method of communicating data signals on a bus having an upstream portion to which transmitters of a plurality of stations are connected, and a downstream portion to which receivers of said plurality of stations are connected, and to which an end station is connected having a transmitter connected more upstream than any of said plurality of stations, comprising the steps of:
(a) appending signals to be transmitted from each of said plurality of stations to the end of a data stream passing thereby;
(b) transmitting a bus clear signal from the end station along the bus, disregarding whether or not there are data signals carried by the bus,
(c) detecting at said plurality of stations signals from upstream including the bus clear signal and in the case of such detection immediately terminating transmission of said signals to be transmitted.

18. A method as defined in claim 17, including the additional step of detecting the end of said bus clear signal at each of said plurality of stations and transmitting data signals having predetermined priority either immediately following the end of the bus clear signal or immediately following a data stream that immediately follows the end of a bus clear signal.

19. A method as defined in claim 17, including transmitting the bus clear signal repetitively at regular intervals, the predetermined priority being highest priority.

20. A method as defined in claim 19, including transmitting from the end station frame numbers of frames in a superframe packet, maintaining in at least one of the plurality of stations an indication of a numbered frame in each superframe in which it is allowed to transmit, detecting said frame number and transmitting packets from said at least one station only during the frame in each superframe in which it is allowed to transmit.

21. A method as defined in claim 18, including the further step of transmitting from the end station round clearing signals at intervals between the bus clearing signals, and for transmitting lower priority signals from said plurality of stations in trains following the round clearing signals.

22. A method as defined in claim 18, in which the lower priority signals are in several priorities, and are transmitted in segmented rounds in order of priority, one priority in each round, in order of decreasing priority.

23. A method as defined in claim 18 including retransmitting a low priority packet having collided with a bus clear signal in a high priority packet train following said bus clear signal.

24. A method as defined in claim 18 including retransmitting a low priority packet having collided with a bus clear signal in a low priority packet train following a round clear signal which follows a high priority data packet train.

25. A method as defined in claim 17 including transmitting timing packets from the end station at predetermined intervals following a bus clear signal.

26. A method as defined in claim 17 including retransmitting packets of data by any of said plurality of stations interrupted in transmission due to detection of said signals from upstream.

27. A method as defined in claim 17, including the step of phase locking the bus clear signal variously to particular ones of said plurality of stations.

* * * * *